US010961108B2

(12) United States Patent
Graef

(10) Patent No.: US 10,961,108 B2
(45) Date of Patent: Mar. 30, 2021

(54) DEVICE FOR FILLING TANKS WITH INTERMEDIATE CONTAINER

(71) Applicant: agrotop GmbH, Obertraubling (DE)

(72) Inventor: Steffen Graef, Obertraubling (DE)

(73) Assignee: AGROTOP GMBH ( * ) Notice: Subject to any disclaimer, the term of this patent is extended or adjusted under 35 U.S.C. 154(b) by 48 days.

(21) Appl. No.: 16/306,456

(22) PCT Filed: May 31, 2017

(86) PCT No.: PCT/EP2017/063170
§ 371 (c)(1),
(2) Date: Nov. 30, 2018

(87) PCT Pub. No.: WO2017/207637
PCT Pub. Date: Dec. 7, 2017

(65) Prior Publication Data
US 2019/0308868 A1 Oct. 10, 2019

(30) Foreign Application Priority Data
May 31, 2016 (DE) ..................... 10 2016 109 990.2
May 31, 2016 (DE) ..................... 10 2016 110 009.9
(Continued)

(51) Int. Cl.
*B67D 7/02* (2010.01)
*B67D 7/16* (2010.01)
(Continued)

(52) U.S. Cl.
CPC ............. *B67D 7/0294* (2013.01); *B67D 7/16* (2013.01); *B67D 7/163* (2013.01); *B67D 7/32* (2013.01);
(Continued)

(58) Field of Classification Search
CPC .......... B67D 7/0294; B67D 7/16; B67D 7/32; B67D 7/163; B67D 7/3227; B67D 7/56; B67D 7/02
See application file for complete search history.

(56) References Cited

U.S. PATENT DOCUMENTS 5,259,423 A 11/1993 Simmel et al. .................... 141/1
6,170,543 B1 1/2001 Simmel et al. ............... 141/346
(Continued)

FOREIGN PATENT DOCUMENTS

DE 200 14 872 1/2001 ............. B65G 45/10
WO WO-9118825 A1 * 12/1991 ............... B67D 7/74
(Continued)

OTHER PUBLICATIONS

US 5,062,459 A, 11/1991, Schrupp (withdrawn)
(Continued)

*Primary Examiner* — Jason K Niesz
(74) *Attorney, Agent, or Firm* — Hayes Soloway P.C.

(57) ABSTRACT

Disclosed is a device for filling tanks from a canister with a first adapter device which is suitable for at least intermittent fastening to the canister and which has a delivery device by which a flowable medium can be conveyed out of the canister into the tank, wherein the device has a flushing agent connection in order to deliver a cleaning liquid to at least one component of the device. The device has a further receiving container to temporarily receive the flowable medium to be introduced into the tank, and the device has a measuring device which is suitable and intended to determine the amount of liquid to be introduced into the tank.

20 Claims, 18 Drawing Sheets

(30) Foreign Application Priority Data

| | | |
|---|---|---|
| Mar. 14, 2017 | (DE) | 10 2017 105 417.0 |
| Mar. 14, 2017 | (DE) | 10 2017 105 418.9 |
| Mar. 14, 2017 | (DE) | 10 2017 105 419.7 |

(51) Int. Cl.
*B67D 7/32* (2010.01)
*B67D 7/56* (2010.01)

(52) U.S. Cl.
CPC ............. *B67D 7/3227* (2013.01); *B67D 7/56* (2013.01); *B67D 7/02* (2013.01)

(56) References Cited

U.S. PATENT DOCUMENTS

| | | | | |
|---|---|---|---|---|
| 6,807,979 | B2 | 10/2004 | Koch et al. | 137/240 |
| 9,802,807 | B2 * | 10/2017 | Ware | B65D 25/14 |
| 9,834,429 | B2 | 12/2017 | Oeser et al. | B67D 7/0288 |
| 2004/0079439 | A1 | 4/2004 | Freeman | 141/59 |
| 2006/0091164 | A1 | 5/2006 | Rau | 222/464.1 |
| 2016/0090290 | A1 * | 3/2016 | Chapron | B08B 9/093<br>141/65 |

FOREIGN PATENT DOCUMENTS

| | | | |
|---|---|---|---|
| WO | 2014/005951 | 1/2014 | F16L 37/30 |
| WO | 2015/042109 | 3/2015 | B67D 7/02 |

OTHER PUBLICATIONS

International Search Report and Written Opinion issued in PCT/EP2017/063170, dated Jan. 17, 2018, with English translations, 35 pages.
International Preliminary Report on Patentability issued in PCT/EP2017/063170, dated Dec. 4, 2018, with English translation, 26 pages.
Partial Search Report issued in PCT/EP2017/063170 dated Sep. 18, 2017, 20 pages.

* cited by examiner

Fig. 7a
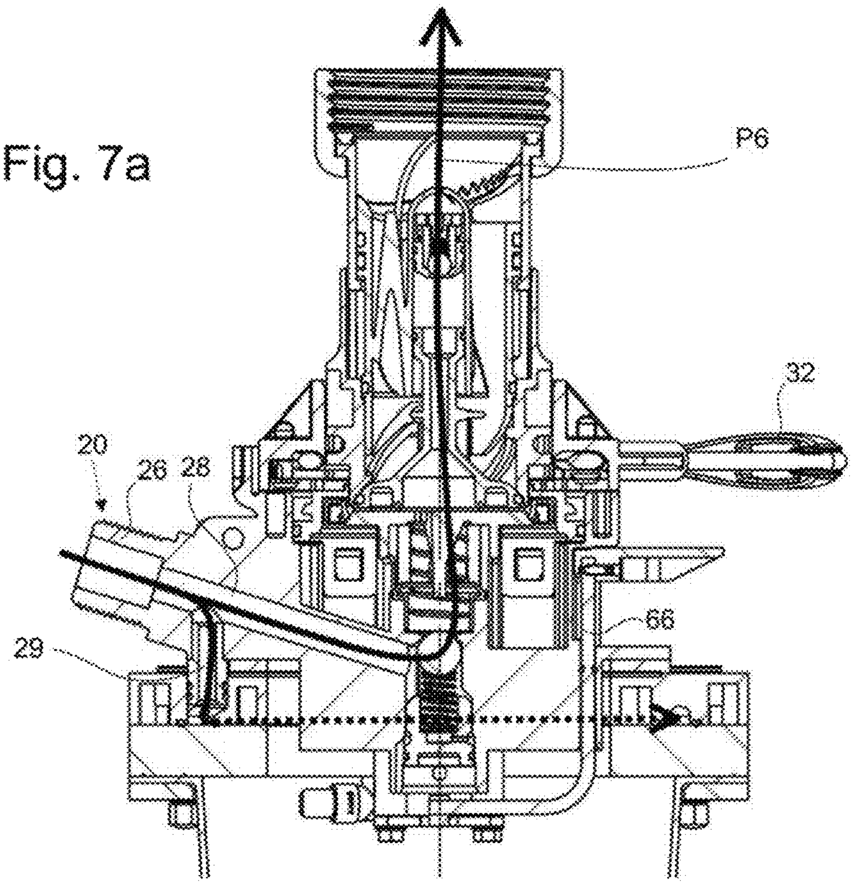
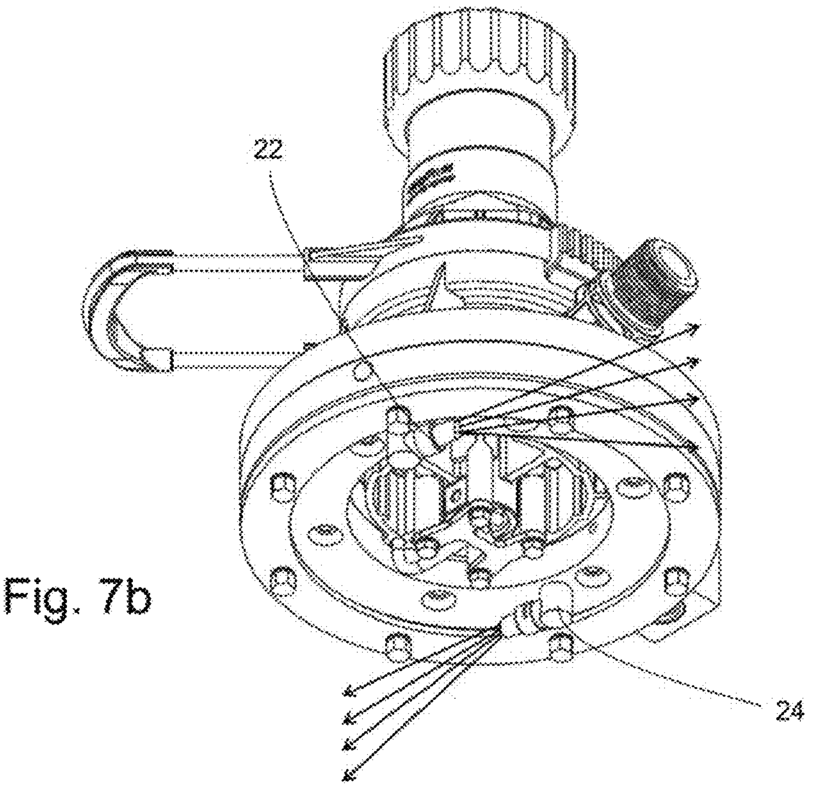
Fig. 7b

DEVICE FOR FILLING TANKS WITH INTERMEDIATE CONTAINER

BACKGROUND OF THE INVENTION

The present invention relates to a device for filling tanks and in particular for contamination-free filling of tanks. Such a device is known for example from WO 2014/005951 A1. In this case the present invention is also directed in particular to a device for example for decanting liquid plant protection agents from small containers, such as for instance canisters or bottles into different larger containers, such as barrels or tanks. Corresponding devices which hitherto have not allowed any cleaning of inner valve components are generally known from the prior art. The device described in the above-mentioned WO 2014/005951 already allows flushing of valve components.

The full content of the disclosure of WO 2014/005951 is hereby incorporated by reference into the subject matter of the present application. In particular, reference is made to the description of the drawings (pages 13 to 20 in the description thereof and to the associated drawings and these are also incorporated by reference into the content of the disclosure of the present application). However, in the prior art it has been shown that a metering of the liquids to be contained or checking of the decanted liquids is often difficult to achieve.

SUMMARY OF THE INVENTION

Therefore the object of the present invention is to provide such a device for decanting liquids which, furthermore, also enables checking of the decanted volumes and also improved handling of such measuring devices.

A device according to the invention for filling tanks for example from a canister has a first adapter device which is suitable and intended for at least intermittent fastening to the canister and which has a delivery device by means of which a flowable medium can be conveyed out of the canister into the tank. Furthermore, the device has a flushing agent connection in order to deliver a cleaning liquid to at least one component of the device. However, a permanent fastening to the canister would also be conceivable.

According to the invention the device has a further receiving container to temporarily receive the flowable medium to be introduced into the tank, and preferably also a cleaning device for cleaning this receiving container, wherein this cleaning device preferably has at least one flushing agent channel which enables cleaning liquid to be conveyed from the flushing agent connection to the receiving container.

The device preferably also has a second adapter device which is suitable for at least temporary (but potentially permanent) and indirect fastening to the tank and/or the receiving container.

Therefore within the context of the present invention an additional receiving container is proposed, which—as mentioned above—serves in particular for temporarily receiving the liquid to be introduced. In this case this receiving container can also enable a measurement of the liquids to be decanted. The device advantageously has a filling opening provided with a valve, by means of which the product can be introduced.

The applicant reserves the right also to claim protection for a device which only has the said receiving container, i.e. that is to say it does not necessarily have a cleaning device for cleaning the receiving container or a ventilation device for delivering air to or venting air from the receiving container.

In a further advantageous embodiment the device has a tank adapter which serves for fastening to a tank. The device advantageously has a first coupling part. Particularly preferably, the said tank adapter has a tank fastening flange for fastening to the tank.

In particular, in an open position the device provides a fluid connection between a canister fastening means, in particular a canister fastening flange, and the tank fastening means, in particular a tank fastening flange, and in a closed position closes the fluid connection between the canister fastening flange and the tank fastening flange.

Due to the accommodation of the flushing connection on the second adapter device, i.e. on the tank adapter, the possibility exists of flushing the connection region between the tank adapter and the canister adapter both when the canister is completely emptied and also in the event of a partial removal.

Moreover, the provision of the flushing connection on the tank adapter has the advantage that the canister adapter has a correspondingly lower weight. This in turn simplifies the handling for the user, since usually he first of all screws the canister adapter onto the canister and then couples this unit consisting of the canister and the canister adapter to the tank adapter. Within the context of the invention it is also conceivable that the canister adapter is a fixed component of the canister. Therefore it is advantageous if the canister adapter is constructed as cost-effectively as possible.

In a further advantageous embodiment the delivery device is constructed as a canister adapter, and this canister adapter preferably also has a canister fastening flange for fastening to a canister. In addition, a second coupling part can also be provided. The above-mentioned first coupling part and the second coupling part can preferably be connected to one another or separated from one another. In other words the said tank adapter and the canister adapter are releasably connected to one another by means of the first and second coupling part.

The above-mentioned valve of the device in an open position enables a fluid connection between the canister adapter or the canister fastening flange and the tank fastening adapter or the tank fastening flange. In a closed position of this valve this fluid connection between the canister fastening adapter and the tank fastening adapter is preferably closed.

In a further advantageous embodiment, in an open position of the valve or the device the said first and second coupling part can produce a first fluid connection between the canister fastening flange and the tank fastening flange and also a second fluid connection which can be shut off between the flushing agent and the canister adapter.

Due to the attachment of the flushing connection to the second adapter device, i.e. to the tank adapter, a possibility is provided in order to flush a connection region between the tank adapter and the canister adapter, for example, if the canister is completely emptied but also in the event of a partial removal. In a further advantageous embodiment for cleaning of the receiving container the cleaning device has at least one outlet element which is oriented in such a way that cleaning liquid exiting from this outlet element reaches an inner wall of the receiving container. In this way an efficient cleaning of the receiving container or the inner wall thereof is possible. In a further advantageous embodiment the at least one outlet element is constructed in such a way that the cleaning liquid reaches an upper edge of the inner wall of the receiving container. Due to gravity the liquid can run downwards and in this way can clean substantially the entire surface of the receiving container.

In a further advantageous embodiment the cleaning device has a second outlet element which is oriented in such a way that cleaning liquid exiting from this second element outlet likewise reaches the inner wall of the receiving container. Thus it is possible that both the first outlet element and also the second outlet element direct the cleaning liquid—preferably, however, at different locations—onto the receiving container. In this way a full cleaning of the receiving container can be simplified.

In an advantageous embodiment the two outlet elements are arranged opposite one another. Thus, for example, it is possible that the outlet elements direct the cleaning liquid onto regions of the receiving container which are arranged opposite one another or which are offset with respect to one another by a circumferential angle of 180°. In addition, it would also be possible that more than two outlet elements are provided. However, regardless of the number of the said outlet elements, they are advantageously uniformly distributed in the circumferential direction of the device.

In a further advantageous embodiment, the cleaning device has at least one second outlet element which is oriented in such a way that cleaning liquid exiting from this second outlet element receiving container also exits in a tangential direction with respect to the circumferential direction of the receiving container. Therefore the receiving container is preferably acted upon in a direction which has both a radial component and also a tangential component. By this procedure the cleaning liquid can be applied in a targeted manner to the receiving container or to the inner wall thereof and in this way can be distributed very uniformly on the inner surface of the receiving container. In this way a very efficient cleaning of the receiving container is possible.

Thus for example it is possible that the liquid reaches the receiving container in such a way that the liquid also runs or trickles spirally downwards under the effect of gravity.

The receiving container advantageously has a rotationally symmetrical configuration and in particular has a circular or conical configuration.

In a further advantageous embodiment the outlet elements are arranged in such a way that the cleaning liquid is directed onto the inner wall at an angle which deviates from the tangential direction by less than 20°, preferably less than 15° and preferably less than 10°.

The cleaning liquids advantageously exit from the two outlet elements in opposite directions. In this way it can be ensured that the cleaning liquid exiting from the two outlet elements respectively are in each case applied to the containers in the same direction of rotation or in the same tangential direction. Thus for example it can be ensured that the cleaning liquid runs off in a clockwise direction or an anti-clockwise direction relative to the receiving container or the wall thereof.

In a further advantageous embodiment at least one outlet element is formed as an outlet nozzle. In this case this outlet element is advantageously spaced apart at least slightly from the inner wall of the receptacle. Advantageously the at least one outlet element is oriented in such a way that the cleaning liquid impinges on the inner wall of the receiving container without significant spraying.

In a further advantageous embodiment at least one outlet element protrudes into the receiving container. In this case this outlet element can preferably have a flushing agent channel which extends substantially in a tangential direction of the receiving container. Advantageously, however, the cleaning liquid already exits from the outlet element inside the receiving container. The liquid preferably exits in a horizontal direction.

In a further advantageous embodiment the flushing agent channel which delivers the flushing agent to the outlet elements, is constructed at least in part as an annular channel. In this way it is possible that the flushing agent is guided, for example, via a laterally arranged flushing agent channel and, from there, via an annular channel to the at least one outlet element and preferably to both outlet elements. In this way it is possible to act uniformly on different regions of the receiving container.

In a further advantageous embodiment the valve also has a closing piston for delivery of the liquid into the tanks. In this case this closing piston can be designed as described in WO 2014/005951.

Furthermore, the present invention is directed to a device for filling tanks from a canister with a first adapter device which is suitable and intended for at least intermittent fastening to the canisters and which has a delivery device by means of which a flowable medium can be conveyed out of the canister into the tank. Furthermore, the device has a flushing agent connection in order to deliver a cleaning liquid to at least one component of the device.

According to the invention the device has a further receiving container to temporarily receive the flowable medium to be introduced into the tank, and preferably a ventilation apparatus for delivering air to and/or venting air from this receiving container. In this embodiment it is possible in particular to take account of the fact that an undesirable negative pressure results from conveying the liquid out of this receiving container into the tank. Thus the ventilation apparatus preferably serves for ventilating the receiving container.

Furthermore, the present invention is directed to a device for filling tanks from a canister with a first adapter device which is suitable and intended for at least intermittent fastening to the canister and which has a delivery device by means of which a flowable medium can be conveyed out of the canister into the tank, wherein the device has a flushing agent connection in order to deliver a cleaning liquid to at least one component of the device.

According to the invention the device has a further receiving container to temporarily receive the flowable medium to be introduced into the tank, and also a discharge device for discharging excess medium.

In this embodiment according to the invention it is proposed that a protective mechanism is preferably provided, which comes into effect if too much medium is delivered for instance during a filling operation. Thus it is in particular conceivable that, in the case of a positive pressure, excess liquid and in particular excess water is discharged. This discharge device preferably serves to guide excess medium, and in particular excess liquid medium, out of the device.

In an advantageous embodiment this discharge device has a first valve device which is suitable and intended to effect discharge of a liquid medium from the device by opening (of this valve device). In this case it is conceivable that, in a normal state, this valve device is closed but, if a positive pressure occurs, it opens and in this way the liquid medium is discharged from the device.

This first valve device is constructed as a non-return valve. This means that above a specific positive pressure this valve device opens and ensures that excess liquid can be discharged.

Particularly preferably, a valve position of this first valve device can be changed by a positive pressure produced in the receiving container and/or the filling canister. In this case it is possible that this first valve device is triggered both pneumatically, that is to say by air pressure, or also hydraulically, that is to say by liquid pressure. In particular, the said first valve can be brought from a closed position into an open position by the positive pressure. In a normal state this first valve is preferably closed. This means that in normal operation no liquid is discharged via this valve.

Due to the procedure described here an internal pressure in the receiving container or the measuring cup can be limited, so that no damage to the receiving element or to the canister can ensue. In a further advantageous embodiment a hose connection is provided for discharging liquid and in particular water. Thus a hose by which water can also be discharged in a targeted manner into a required region can be connected to the device.

This first valve, which is particularly preferably configured as an overflow valve, opens at a specific pressure and limits the internal pressure, so that there is no damage. In the case where the receiving container is fully or completely filled with liquid medium or also only partially filled and then a positive pressure is produced, it is also possible that contaminated liquid can flow off. It is therefore preferable that a hose system or an overflow hose is led off without resistance into a further device such as for instance a spraying unit or also a flushing air-lock or a container.

In a further advantageous embodiment the said discharge device has a second valve device. This second valve device is preferably a further roll-over valve which in particular, however, does not serve exclusively for the purpose of preventing pulsation of liquid in the discharge conduit. In this case this second valve device is preferably arranged in a portion of the discharge device. In a further preferred embodiment the device has a hose adapter.

In a further advantageous embodiment the ventilation apparatus has a valve device which controls an air flow between the receiving container and the environment.

In this case this valve device can be set in such a way that ventilation only occurs above a specific negative pressure in the receiving container.

In a further advantageous embodiment this valve device can be configured as a non-return valve. In this case this valve device can advantageously have a spring-loaded valve body which forces the valve into a closed position. In this case this valve body can be arranged so that above a specific negative pressure air can enter the receiving container, but no air or a positive pressure can be discharged by means of this valve device.

Therefore this valve advantageously opens only above a specific negative pressure.

The said valve body is advantageously movable in a longitudinal direction, wherein this longitudinal direction is in particular a longitudinal direction of the receiving container or a main flow direction of the liquid to be introduced into the tank. This is in particular a vertical or substantially vertical direction.

In a further advantageous embodiment the ventilation apparatus enables delivery of air into the receiving container and shuts off a removal of air from the receiving container. In a further advantageous embodiment the valve housing is made from a plastic.

Particularly preferably, the ventilation apparatus and/or a valve device of the ventilation apparatus is arranged laterally on a support of the device. In a further advantageous embodiment has the air supply or venting arrangement has at least one air channel which extends at least in part in a straight line. In particular this air channel extends through a housing and/or in a radial direction of the device. In this case it is also possible here that this air channel is formed at least in part as an annular channel.

In a further advantageous embodiment this said valve device of the ventilation apparatus is constructed as a float valve. Thus it is conceivable that this valve device has a hollow ball which is preferably in an open state in an unfilled state of the receiving container. In this position ventilation is possible. In other words air can flow in freely here and in this way the canister can be prevented from collapsing due to a negative pressure.

In the case of over-filling of the receiving container, the ball floats on the liquid medium and preferably closes relative to a seal seat. In this case the medium cannot exit further. However, it is nevertheless guaranteed that excess air can escape. In a further advantageous embodiment the ventilation apparatus can also be manually actuated and in particular can be closed. In order that drawing off from large containers with the hose adapter is also possible, the replenishment of air can be interrupted here additionally by for instance pressing of a push button. In this case negative pressure, which is necessary for suction, can be established. Furthermore, however, a positioning device is provided which, after the reduction of a negative pressure in the entire system, causes this writing or sensing device to open independently. For this purpose for example a pretensioning means such as a spring can be provided which, after the reduction of the negative pressure causes opening of the push button and thus also of the valve.

In a further advantageous embodiment a connecting channel is provided which connects the overflow valve and/or the ventilation valve to an interior space of the receiving container. In this case it is conceivable that the same channel produces both the flow connection between the overflow valve and also the flow connection between the ventilation valve and the interior of the receiving container. This connecting channel preferably has a cross-section which is greater than[1]. In this way it is possible to reduce the flow resistance for the air and thus also the maximum achievable negative pressure during the extraction. This also applies correspondingly in the case of the positive pressure for the outflowing water.

Preferably the two said valves are in particular arranged adjacent to one another on an outer face of the device.

In a further advantageous embodiment the device has a measuring device for determining the amount of liquid to be introduced into the tank. In this case, for example, a through flow measuring device can be provided which determines a flow rate of the liquid.

Advantageously, however, the further receiving container is constructed as a measuring device for determining the amount of liquid to be introduced into the tank, or this receiving container has such a measuring device. Thus for example it is possible that this receiving container is transparent and, for example, has on a wall a scale for measuring the liquid located in the container or the amount thereof.

Furthermore, the present invention is directed to a device for filling tanks from a canister with a first adapter device which is suitable for at least intermittent fastening to the canister and which has a delivery device by means of which a flowable medium can be conveyed out of the canister into the tank. Furthermore, the device has a flushing agent connection in order to deliver a cleaning liquid to at least one component of the device.

According to the invention the device has a further receiving container to temporarily receive the flowable medium to be introduced into the tank, and the device has a measuring device which is suitable and intended to determine the amount of liquid to be introduced into the tank. Furthermore, the device additionally has a display device by means of which at least one spatial position of at least one component of the device can be detected and in particular can be read off. Thus in this embodiment according to the invention it is proposed that not only the amount to be introduced can be determined but, furthermore, also a positioning of at least one component of the device and in particular of the receiving container. This takes account of the fact that filling often takes place under conditions in which the receiving container is not upright and therefore the measurement results are falsified. The additional display device ensures that a reliable and realistic reading of the measuring device is possible.

The position of the component of the device is preferably a pivoted position and in particular a pivoted position in space. Preferably, therefore, the respective pivoted position of the device can be recorded by means of the display device.

In a preferred embodiment the receiving container is at least partially and preferably completely transparent. In this case it is possible to record, through a wall of the receiving container, in particular a filling level of a substance and in particular a liquid located in the interior of the receiving container. The measuring device preferably has a measuring scale. In this case this measuring scale is particularly preferably arranged in a transparent area.

This is preferably a measuring scale which enables a linear readout.

In a further preferred embodiment the receiving container expands in one direction, and can for example enlarge or extend conically from the bottom upwards.

In a further advantageous embodiment the display device enables detection of the spatial position with respect to at least two pivot axes and preferably with respect to at least two pivot axes which are perpendicular to one another. In this way in particular it can be ascertained whether and possibly when the receiving container in a preferred position is oriented for example exactly vertically.

In a further advantageous embodiment the display device is arranged on a surface of the device which is arranged horizontally in operation. In this way a particularly convenient and reliable readout is achieved. Thus for example the device can have a fastening flange by means of which for example the receiving container is fastened to further components. In this case this receiving area can have the said horizontal surface on which in turn the display device is arranged.

In a further advantageous embodiment the display device has a cavity filled with a liquid. This is advantageously a closed cavity. An air bubble or another suitable float element can be located inside this cavity.

In a further advantageous embodiment the display device is a so-called bubble tube. In this case this bubble tube is preferably movable not only in a direction, but preferably within a plane so that, as mentioned above, a pivoted position with respect to two pivot axes which are perpendicular relative to one another can be determined. In this way an orientation with respect to two axes can take place in a particularly simple manner by means of the bubble tube.

In a further advantageous embodiment the measuring device has a measuring scale which can be read off. Advantageously the display device is arranged in such a way that the display device and the readable measuring scale can be observed simultaneously.

In a further advantageous embodiment the device has a cleaning device for cleaning this receiving container, which preferably has at least one flushing agent channel which enables cleaning liquid to be conveyed from the flushing agent connection to the receiving container. In this way it is possible in a particularly simple manner also to clean the receiving container.

In a further advantageous embodiment the cleaning device has at least one outlet element which is oriented in such a way that cleaning liquid exiting from this outlet element reaches an inner wall of the receiving container.

Thus the above-mentioned display device serves in particular but not exclusively in order to reduce a metering error which can occur due to a tilted position of the receiving container or of the cup.

In a further advantageous embodiment the receiving container has a funnel-shaped portion.

In a further advantageous embodiment a further valve device can be arranged between the receiving container and the tank. In this way the receiving container can first of all be filled with a specific filling quantity of liquid being and then this filling quantity can be drained off into the tank. In this way it can be ensured that only a precisely defined amount of liquid arrives in the tank. This can also be helpful in particular if a plurality of liquids are to be mixed together in a tank.

In a further advantageous embodiment the receiving container has fastening means for fastening to the tank. In this case this may be a thread or the like.

In a further advantageous embodiment the further receiving container is produced from a plastic. Advantageously the receiving container makes it possible to the receive a larger volume of liquid than the rest of the regions of the device and in particular than the rest of the conduits which lead from the canister adapter to the receiving container. As mentioned above, the further receiving container is preferably rotationally symmetrical.

In a further advantageous embodiment the receiving container is arranged downstream with respect to the delivery device in a flow direction of the liquid to be introduced into the tank. This means that the liquid from the tank initially enters the receiving container by means of the adapter devices and from there can be drained off into a tank.

In a further advantageous embodiment the ventilation apparatus has a valve device which is arranged between the receiving container and the tank to be filled. In this case this valve device can directly adjoin the receiving container. This valve device can preferably be actuated manually. Thus with the valve device closed the receiving container can be filled with liquid, wherein the amount of the introduced liquid can be determined for example by means of the above scale. Subsequently this valve device can be opened in order to let the measured liquid flow off into the tank. In this case it is possible that a channel for conveying the liquid adjoins this valve device.

Advantageously the receiving container is also arranged downstream with respect to the flushing connection. Particularly preferably the receiving container has a circumferential edge, in particular a circumferential edge by which it can be flange-mounted on an adapter element.

In a further advantageous embodiment sealing means, such as for example O-rings or the like, can be provided between the coupling elements. Thus for example a sealing element can be arranged on the first or second coupling part.

In a further advantageous embodiment in the adapter device which is provided for arrangement on the canister a valve element is arranged, and in particular a closing piston which is preferably adjustable by means of an actuating element between an open position and the closed position. In this case this closing piston can have an inner channel which in the open position of the device provides a second fluid connection for example between the flushing connection and the canister fastening connection. In addition, this canister adapter can have an outer channel which is arranged around this closing piston and which in the open position produces a part of a fluid connection between the canister and the tank or between the canister and the further receiving container.

According to a further embodiment of the invention the first and the second coupling part are constructed so that in the open position of the device they provide a first fluid connection between the canister fastening flange and the tank fastening flange and a second fluid connection, which can be shut off, between the flushing connection and the canister fastening flange.

For fluid-tight connection of the tank adapter and the canister adapter at least one sealing element can be provided on the first or second coupling part. According to a further embodiment of the invention a closing piston, which is adjustable by means of an actuating element between the open position and the closed position, is guided in the canister adapter. This closing piston can have an inner channel which in the open position of the device provides the second fluid connection between the flushing connection and the canister fastening flange. Furthermore, this canister adapter can have an outer channel which is arranged around the closing piston and which in the open position forms a part of the first fluid connection between the canister fastening flange and the tank fastening flange.

Furthermore, the closing piston can have a first contact surface which is in operative contact with a second contact surface provided on the tank adapter when the second coupling part of the canister adapter is coupled to the first coupling part of the tank adapter. According to a preferred embodiment of the invention it is provided that the inner channel of the closing piston opens with one end in the first contact surface and with its other end is connected to the canister fastening flange, and the tank adapter has a closable connecting channel which opens with one end in the second contact surface and with its other end is connected to the flushing connection, wherein the connecting channel opening in the second contact surface and the inner channel of the closing piston opening in the first contact surface are connected to one another when the tank adapter and the canister adapter are in contact with one another by means of the two contact surfaces. In this case it is advantageous if at least one seal is provided between the two contact surfaces.

According to a further embodiment of the invention the closing piston is guided in a sliding guide on the canister adapter, wherein a rotation of the canister adapter causes a displacement of the closing piston relative to the canister adapter. Furthermore, it can be provide that the second coupling part of the tank adapter is held rotatably on the tank adapter by an actuating element. In a further embodiment the first contact surface of the closing piston is in contact in a rotationally fixed manner with the second contact surface on the tank adapter when the second coupling part of the canister adapter is coupled to the first coupling part of the tank adapter (i.e. the second adapter device), wherein a subsequent rotation of the second coupling part relative to the tank adapter causes a displacement of the closing piston relative to the canister adapter (i.e. the first adapter device).

Furthermore, it is advantageously provided that the first contact surface of the closing piston is in contact with the second contact surface on the tank adapter when the second coupling part of the canister adapter is coupled to the first coupling part of the tank adapter, and wherein in the direction of movement of the closing piston the second contact surface is held displaceably on the tank adapter and a spring element presses the second contact surface against the first contact surface. The displacement or a lifting off of the second contact surface from the first contact surface can take place by a further actuating element, whilst the second coupling part of the canister adapter is coupled to the first coupling part of the tank adapter. In this way an additional flushing or cleaning of the two contact surfaces with a cleaning liquid delivered by means of the flushing connection is possible.

Canisters, in particular those which contain plant protection agents, are closed in the region of the outlet by a sealing film before the first use. Such sealing films are frequently removed by the user by hand, wherein skin contact with the fluid or any protective glove can easily occur. In a preferred embodiment of the invention the canister adapter is therefore provided in the region of the canister fastening flange with an integrated film cutting element for cutting the sealing film on the canister. In this case the film cutting element can be formed by a toothed rim oriented in particular obliquely with respect to the longitudinal central axis of the canister adapter. Furthermore, the canister adapter can have a sliding sleeve, on which the canister fastening flange is fastened, wherein the sliding sleeve is axially movable relative to the film cutting element.

Therefore, due to the integrated film cutting element, the user does not have to remove the sealing film himself, but merely screws the canister adapter with the aid of the fastening flange onto the outlet opening of the canister. Either due to this screwing operation the sealing film is automatically cut away or the opening takes place only after the screwing on, as the film cutting element is brought by means of the sliding sleeve into contact with the sealing film for opening thereof.

Furthermore, the present invention is directed to a device for filling tanks from a canister. This device has a first adapter device which is suitable for at least intermittent fastening to the canister and which has a delivery device by means of which a flowable medium can be conveyed out of the canister into the tank. Furthermore, the device has a flushing agent connection in order to deliver a cleaning liquid to at least one component of the device.

According to the invention the device has a further receiving container to temporarily receive the flowable medium to be introduced into the tank, and furthermore the device has a cleaning device for cleaning this receiving container, and also at least one outlet element which delivers a flushing medium to the receiving container. Therefore in this embodiment it is proposed that specifically cleaning of the said receiving container is also possible.

In a preferred embodiment, this application device is in flow connection with the flushing agent connection by means of a connecting conduit. In this case it is possible that this connecting line branches off from the said flushing agent connection. Thus for example a T-piece or a hose piece is provided which enables branching off of the connecting line starting from the flushing agent connection. In this way a cleaning medium for cleaning of the receiving container can be delivered directly by means of the flushing agent connection.

In a further advantageous embodiment the outlet element is arranged in such a way that cleaning liquid exiting from this outlet element reaches an inner wall of the receiving container.

In a further advantageous embodiment the outlet element is arranged in such a way that cleaning liquid exiting from this outlet element produces a vortex inside the receiving container.

In principle it is recommended that the system is cleaned after measurement of the liquid medium is completed. In this case it is also possible and preferred that the canister is cleaned in particular by means of a canister adapter. Flushing nozzles are preferably provided for cleaning of the receiving container, wherein as mentioned above these nozzles can be attached for example below the flanges. Due to their specific arrangement these nozzles preferably generate a vortex which cleans the receiving container within a short time.

In a further advantageous embodiment the outlet element has a predetermined flow cross-section which is chosen in such a way that at least during the cleaning operation more liquid flows into the receiving container than cleaning liquid flowing off. In other words, in particular a cross-section of these application elements or nozzles is designed in such a way that more water flows into the cup than can flow off. In this way the said vortex also builds up as far as the above-mentioned tank adapter. Thus in particular it is also possible that the complete receiving container and also a predetermined region or in particular a lower part of the tank adapter can be cleaned.

For supplying the said supply elements or flushing nozzles a channel can be provided which in particular is arranged in the connecting flange. This channel in turn can also be connected to the tank flange. Thus, starting from the flushing connection of the tank flange, fresh water can be branched off downwards into the receiving container.

In a further advantageous embodiment the said connecting line therefore extends at least in part through a fastening flange which serves for fastening the delivery device to the receiving container. Advantageously this connecting line extends through both of the said connecting flanges.

In a further advantageous embodiment the said connecting line extends in a straight line and particularly preferably in a vertical direction through the connecting flange.

In a further advantageous embodiment the device has at least two outlet elements in order to clean the receiving container.

These two outlet elements can be arranged, as mentioned above, at an angle von 180° with respect to one another in the circumferential direction of the receiving container. These two outlet elements advantageously generate a vortex, wherein the output jets of this vortex are offset by 180° with respect to one another.

In a further advantageous embodiment the device has at least one annular channel for supplying at least one outlet element with liquid. In particular, the cleaning agent is a flushing agent. In a further advantageous embodiment the two outlet elements are of the same construction.

In a further advantageous embodiment, which in particular can be combined with all of the aforementioned embodiments, but for which protection can also be claimed by itself, the receiving container has a support ring to which it is fastened. In this case this support ring can have securing elements in order to achieve a better installation of the support ring. Thus two or more fastening eyes, which enable fastening, can be provided for example on an outer circumference of this support ring. Advantageously three such fastening means are provided, which in particular are uniformly distributed in the circumferential direction of the flange.

In a further advantageous embodiment the device has a holding device which enables the user to fasten the device to a further unit, such as for example a spraying unit. In this case this holding device can also be combined with the above-mentioned embodiments. However, the applicant also reserves the right to claim protection for a device for filling tanks from a canister with a first adapter device which is suitable for at least intermittent fastening to the canister and which has a delivery device by means of which a flowable medium can be conveyed out of the canister into the tank. In this case the device has a flushing agent connection in order to deliver a cleaning liquid to at least one component of the device.

According to the invention the device here has a holding device in order to fasten the device to a further element, such as in particular but not exclusively a spraying unit. Preferably the device here has a receiving container, and thus the holding device also serves for fastening this receiving container to a further unit. In a preferred embodiment this holding device is arranged in a region in which the receiving container is also located. Thus, for example, the holding device can be configured in such a way that it engages around the receiving container from above and below. This holding device can also advantageously form a receiving space which can receive at least one component of the receiving container in the circumferential direction thereof. In this case it is possible that the holding device has an annular portion through which at least one component of the receiving container or a further component of the device protrudes.

In a further advantageous embodiment the holding device has a fastening portion which enables the most variable possible fastening of this holding device to a further device. Thus this fastening portion can for example have a plurality of elongate holes, in order in this way to achieve the greatest possible versatility. Thus due to these many possible securing arrangements the orientation of the system can also be implemented easily.

In a further advantageous embodiment the holding device is arranged on the device in such a way that the above-mentioned valves are located above the holding device and thus are relatively well protected against mechanical influences.

In a further advantageous embodiment the holding device also has a fastening device in order to be fastened to a discharge conduit which leads out of the receiving container.

Further advantages and embodiments are apparent from the appended drawings.

BRIEF DESCRIPTION OF THE DRAWINGS

In the drawings:

FIG. 7*a* shows the device shown in FIG. 6 from a further perspective;

FIG. 7*b* shows a representation obliquely from below of the device shown in FIG. 6;

DETAILED DESCRIPTION OF THE INVENTION

Figure 1:
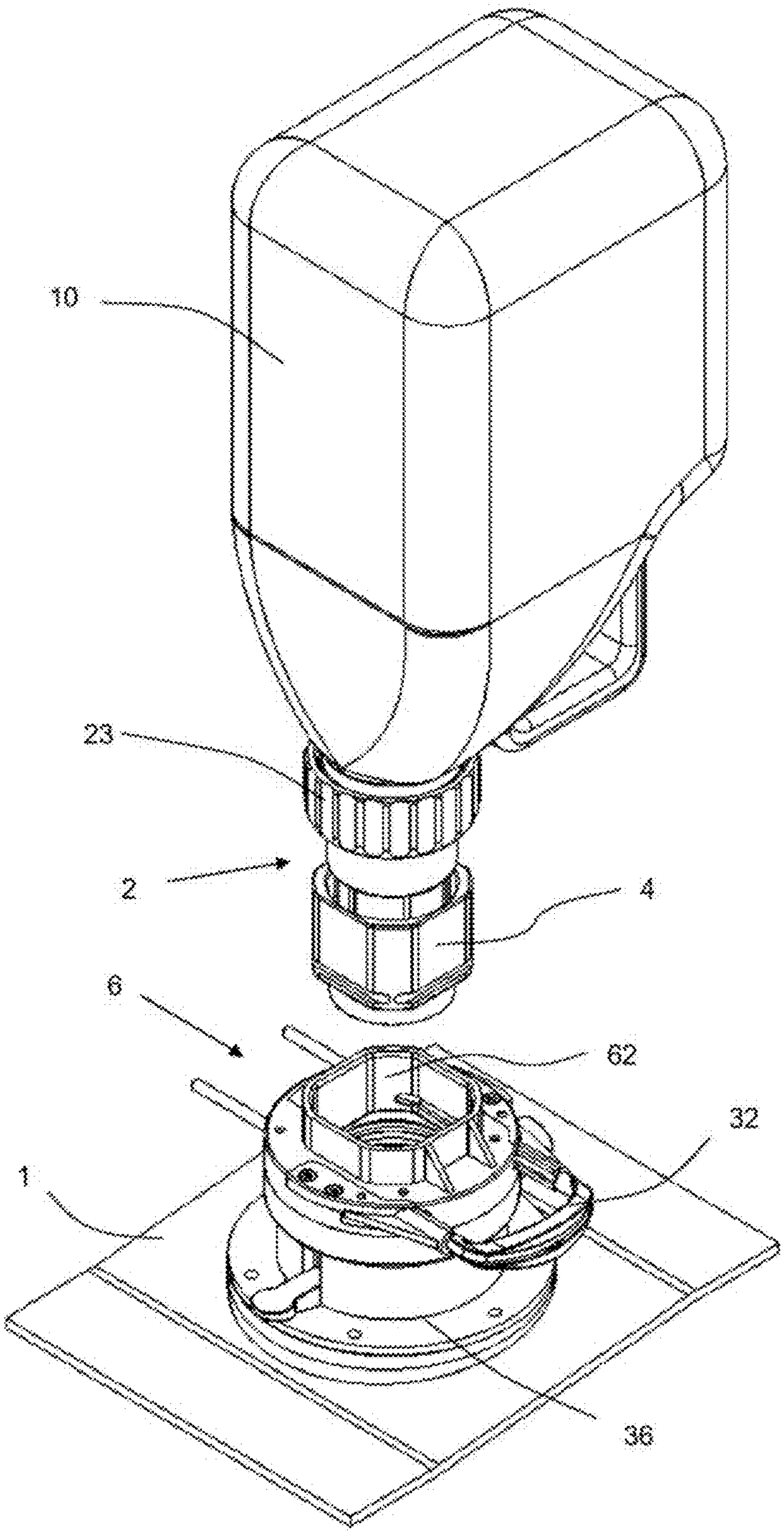
Fig. 1 PRIOR ART
FIG. 1 shows a three-dimensional representation of a device according to the prior art.

FIG. 1 shows a device 100 for contamination-free filling of a tank 1 from a canister 10 before the coupling of the canister to the tank. The device has a tank adapter 6 with a tank fastening flange 36 for fastening to the tank 1 and a first coupling part 62 as well as a canister adapter 2 with a canister fastening flange 23 for fastening to the canister 10 and a second coupling part 4. The canister fastening flange 23 is configured here as a union nut which interacts with an external thread of an opening of the canister 10. Two V pulleys which are rotatable counter to one another are preferably provided for fastening of the tank adapter 6 to the tank 1.

Figure 2:
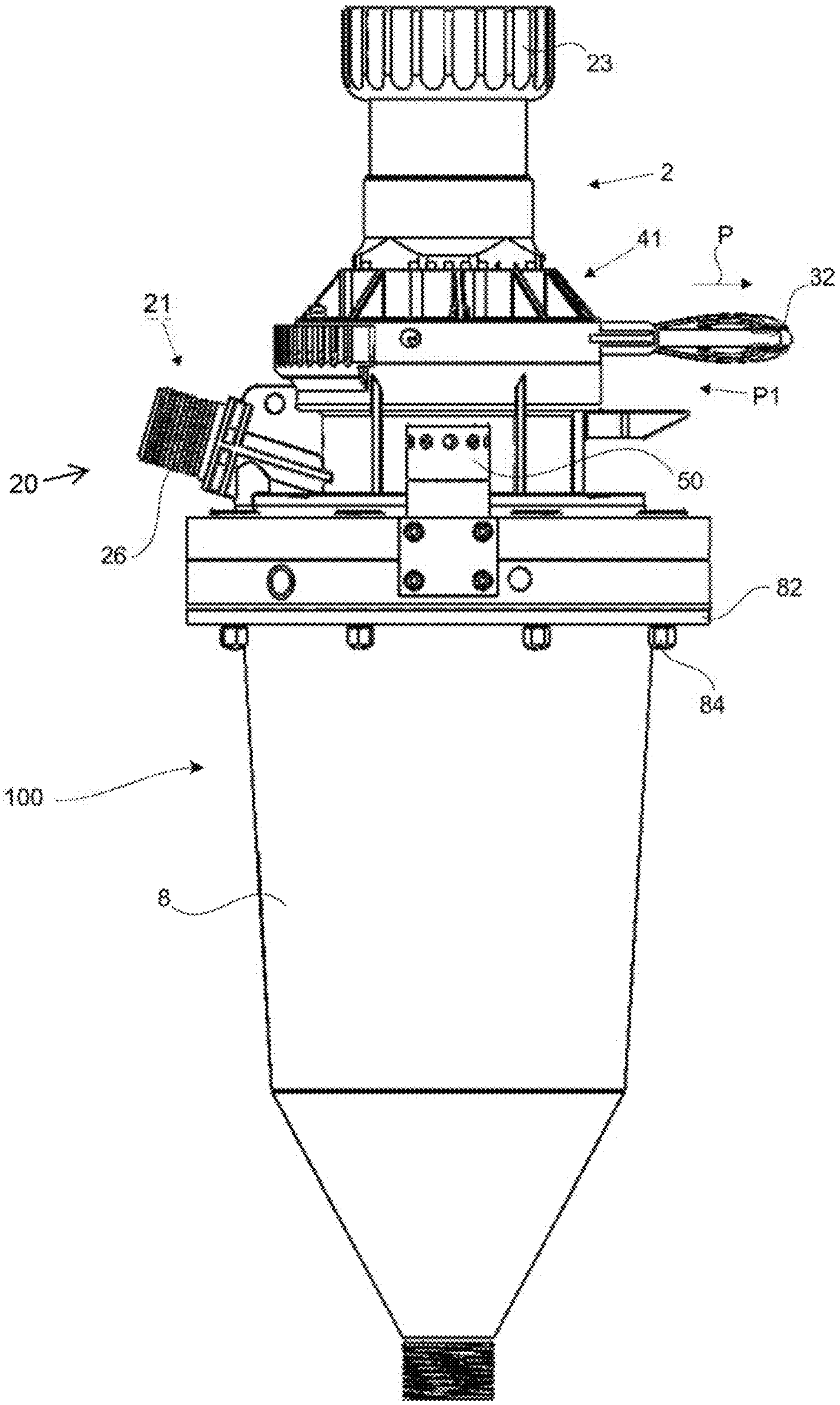
FIG. 2 shows a plan view of a device according to the invention.

FIG. 2 shows a side view of a device according to the invention without the tank. In this case in particular a flushing agent connection 21 can also be seen. This has an external thread 26 in order for example to connect a flushing agent hose. The reference numeral 50 designates a ventilation apparatus as a whole in particular for ventilating the receiving container 8. The reference numeral 82 designates a fastening flange, by which the receiving container 8 can be screwed onto the device by means of fastening screws 84. The reference numeral 32 designates a grip element, by which the connection between the coupling parts 4 and 6 can be produced or interrupted. The reference 20 designates the cleaning device as a whole.

Figure 3:
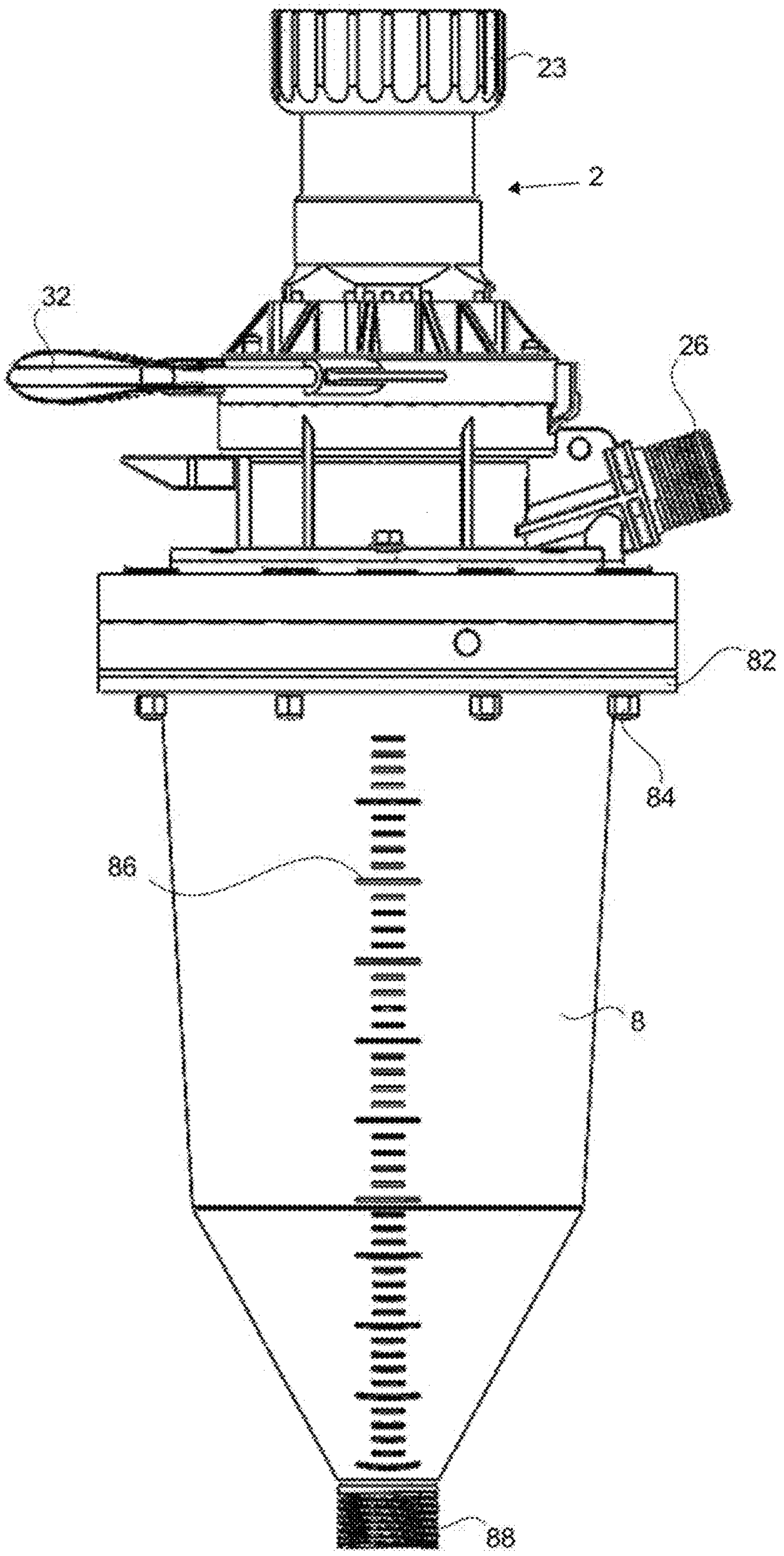
FIG. 3 shows a further representation of a device according to the invention.

FIG. 3 shows a further representation of the device 1 according to the invention. It will be recognised that the receiving container 8 here has a scale 86. This can serve for determining the liquid located in the receiving container 8.

The reference numeral 88 designates a thread by which for example a further valve element can be connected below the receiving container. The quantity of liquid located in the receiving container 8 can be determined by means of this valve element.

Figure 4A:
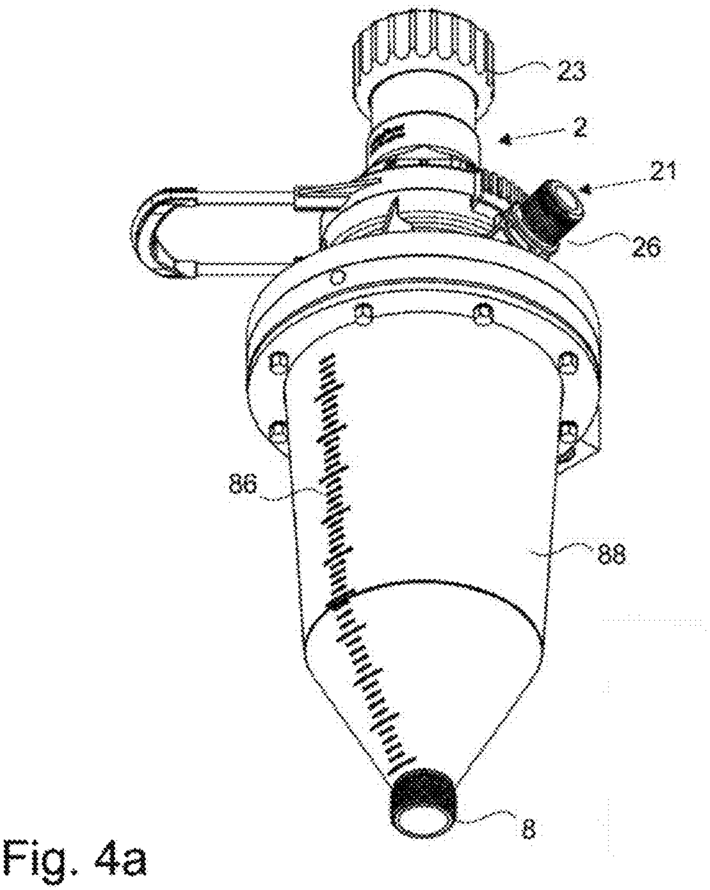
FIGS. 4*a*, 4*b* show two perspective representations of a device according to the invention.
Figure 4B:
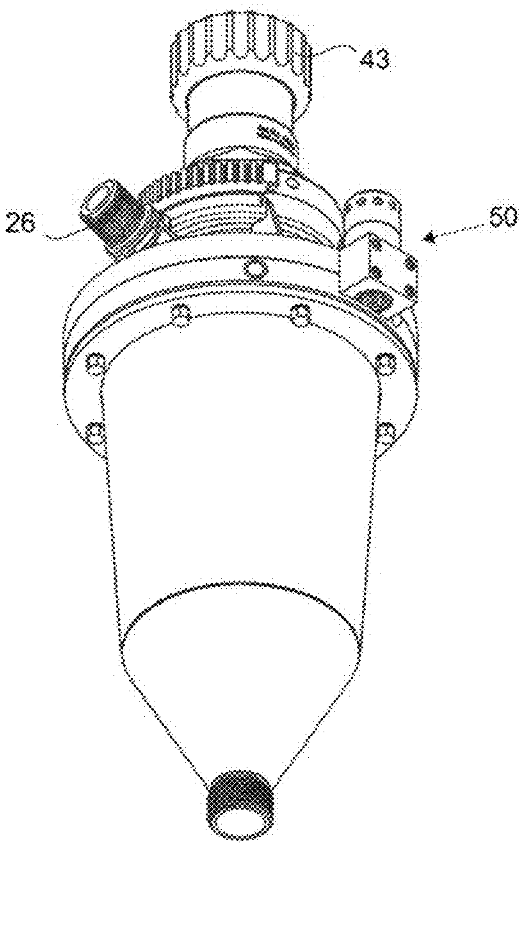

FIGS. 4*a* and 4*b* show two perspective representations of a device according to the invention. It will be recognised that the receiving container 8 here has a funnel-shaped or conical lower portion 8*a*.

Figure 5:
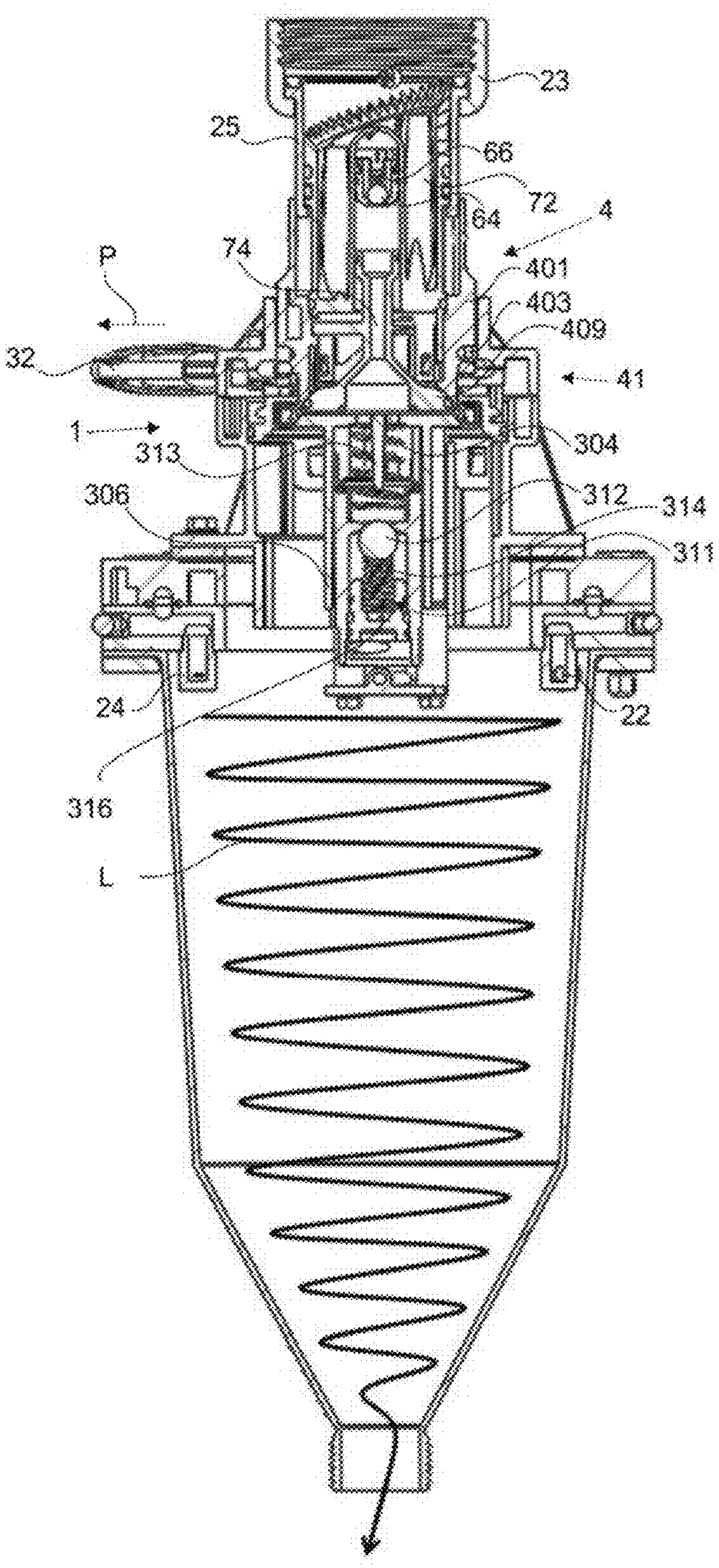
FIG. 5 shows a sectional representation of a device according to the invention.

FIG. 5 shows a sectional representation of the device according to the invention. It will be recognised here that the canister fastening flange 23 itself is fastened to a pipe 25 and engages behind this. In addition, a circumferential sealing means such as an O ring can be provided, which produces a fluid-tight seal. The reference numerals 64 and 66 relate to a valve device which serves in particular for the flushing operation. The valve or the valve ball is pushed upwards by a flowing and flushing liquid upwards from the bottom and thus the flushing valve is opened. For this purpose for example a pressurised water conduit can be connected to the flushing agent connection 21 (cf. FIG. 4*b*) which serves for flushing the device.

The second coupling part 4 here has an octagonal external cross-section which is designed to be complementary to the first coupling part 41. When the two adapters are fitted together, the second coupling part 4 is inserted into the first coupling part 41. The actuating element 32 constructed here as a securing clip serves, by pulling in the direction of the arrow P towards the right, for fixing and securing the second coupling part in the first coupling part 41. In this case the actuating element 32 is approximately U-shaped, wherein the two arms are preferably bent inwards at right angles in front arm regions relative to the remaining arm regions.

For introduction of the canister adapter into the tank adapter, is located with its branch regions in the region of the first coupling part 41, so that the canister adapter can be introduced. Through pulling of the actuating element 32 in the direction of the arrow P, the branch regions of the actuating element are displaced into the region of the first coupling part and there they come into engagement there with grooves formed with a canister adapter. For release of the two adapters the actuating element is pushed into the tank adapter in the direction of the arrow P1, so that the arm regions release the canister adapter again. The reference numeral 403 designates a sealing element which is arranged above the said arm regions and in a coupled state enables sealing of the two coupling parts.

For the purpose of cleaning, a first shut-off element 312 constructed as a ball valve and the above-mentioned second shut-off element in the form of the ball valve 64 and 66 are formed in the flow path of the cleaning liquid in the region of the connecting channel 311. The first shut-off element is opened by means of an actuating pin 313 connected to the sliding sleeve 306 when the sliding sleeves 306 are shifted in their position. Due to the closed position of the first shut-off element 312 according to FIG. 5 exit of cleaning liquid is reliably avoided even if the cleaning liquid is present under pressure, since the pressure of the cleaning liquid presses the shut-off element 312 into its closed position. Moreover, the shut-off element is pressed by a spring element 314 into the closed position. In order that in one position of the shut-off element the flushing conduit in the closed position according to FIG. 5 remains pressureless, a small hole 316 is provided, through which any cleaning liquid 6 present can flow off into the tank.

With regard to the details of the cleaning operation and also the filling operation of tanks, reference is made to the above-mentioned WO 2014/005951 and in this case in particular to the description on page 5, 3rd paragraph, to page 7, 1st paragraph. In this respect the subject matter of this document is also incorporated into the subject matter of the present disclosure.

The reference numerals 22 and 24 designate two cleaning elements in the form of cleaning nozzles which protrude into the receiving container 8 and which serve for cleaning of the receiving container 8. The cleaning liquid exiting from these cleaning elements 22 and 24 runs down, as illustrated by the solid line L, spirally on the inner wall of the receiving container.

Figure 5A:
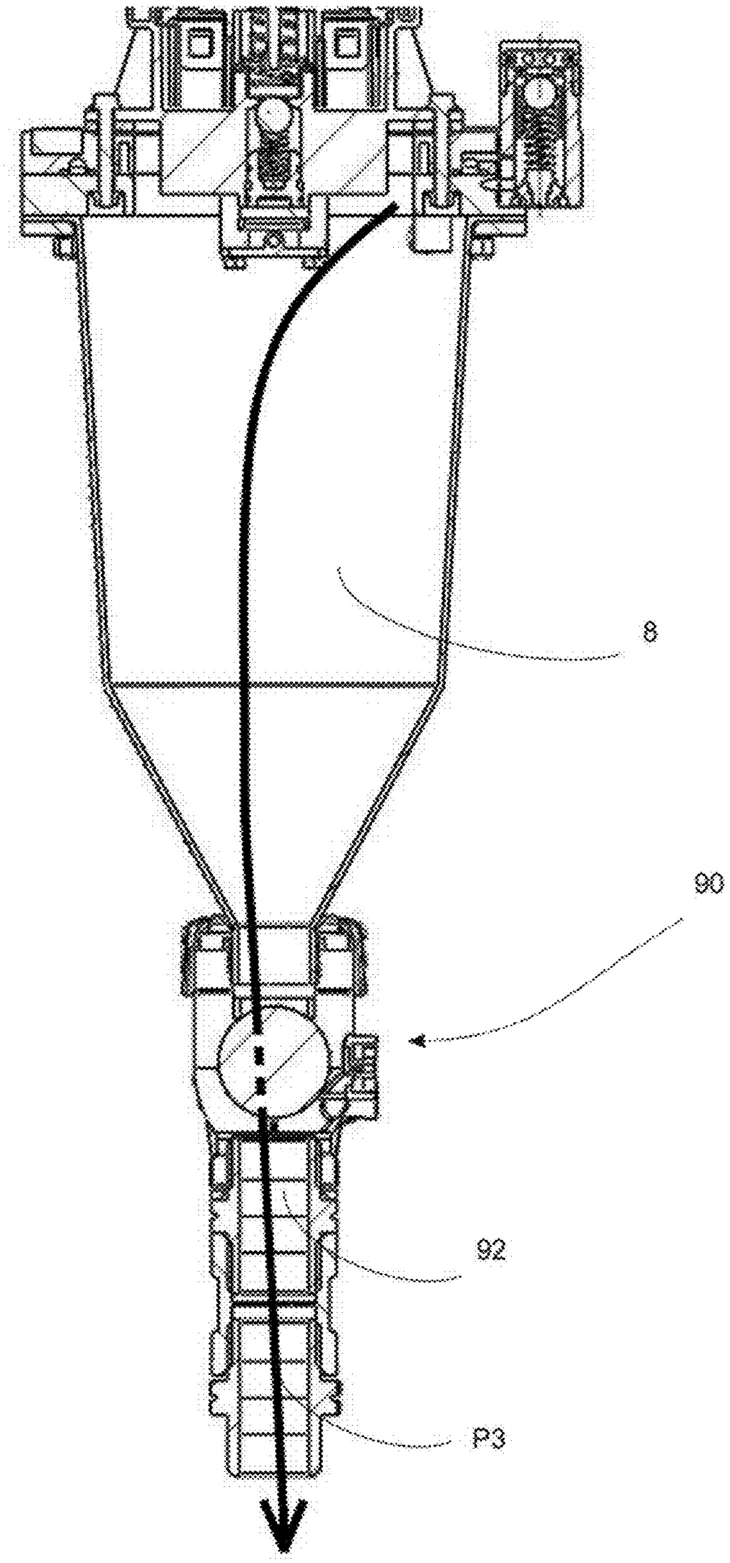
FIG. 5*a* shows a representation of the device with receiving container and subsequent valve.

FIG. 5*a* shows a further representation of the device illustrated in FIG. 5, wherein here too the valve device provided below the receiving container 8. The container can first of all be filled with a liquid to be measured by means of the valve device. After opening of the valve device the liquid thus measured can enter the tank (not shown) via the channel and along the arrow P3.

Figure 6A:
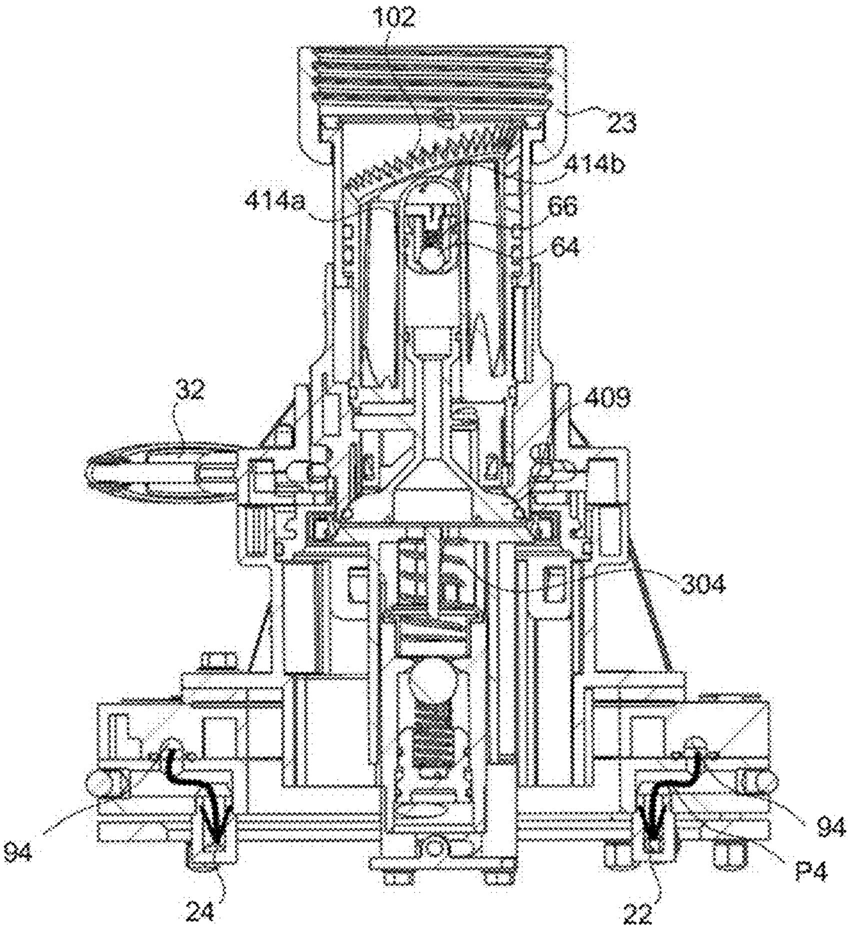
FIG. 6*a* shows a detail of the device shown in FIG. 5 without the further receiving container.

FIG. 6*a* shows a representation of a detail of the device shown in FIG. 5, wherein the flow pattern of a flushing agent is indicated by the two arrows P4. In this case in particular an annular channel portion 94 can be seen here which distributes the flushing liquid to the two cleaning elements 22 and 24.

Figure 6B:
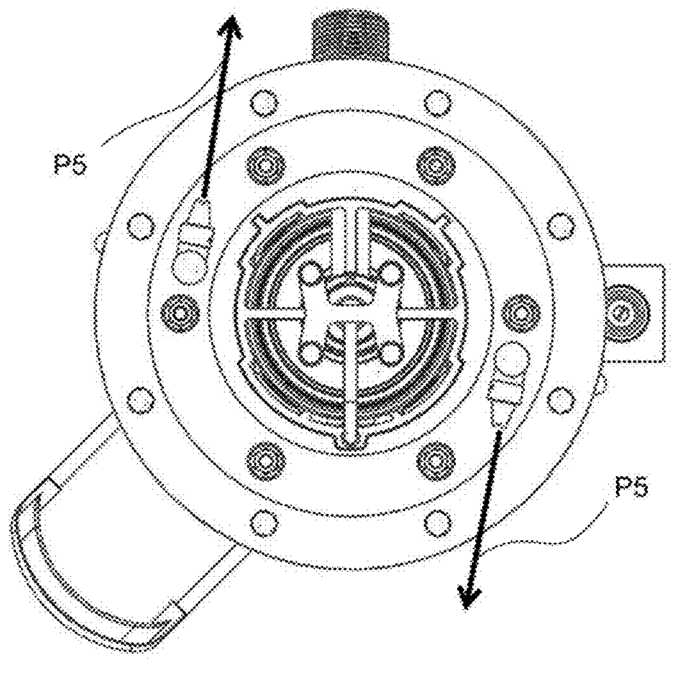
FIG. 6*b* shows a representation from below of the device shown in FIG. 6.

FIG. 6*b* shows a view from below of the device shown in FIG. 6. In particular here the orientation of the two cleaning elements 22 and 24 can be seen, which are designed so that the flushing agent exits along the arrow P5 in a direction which is slightly oblique relative to the tangential direction of the receiving container 8.

FIG. 7*a* shows the complete flushing agent flow route when liquid is delivered by means of the flushing agent connection 26 and the channel 28.

In this case the liquid passes upwards along the arrow P6 and the valve 312, and on the other hand it is distributed to the two cleaning nozzles via an annular channel (along the dotted line). FIG. 7*b* shows in this view from below the flow of flushing agent exiting from the cleaning elements 22 and 24. The reference numeral 29 designates the branch channel which branches off from the channel 28. Thus the flushing agent connection 26 first of all opens into the channel 28 and the branch channel 29 branches off from this.

Figure 8A:
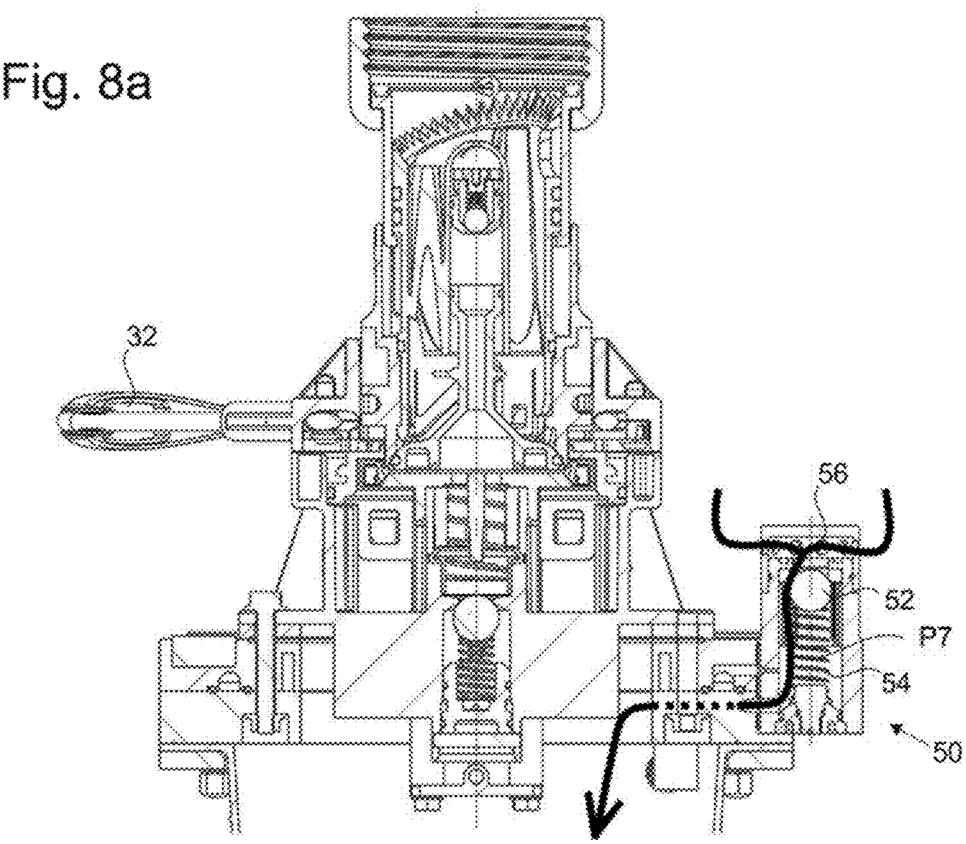
FIGS. 8*a*, 8*b* show two representations of the device illustrated in FIG. 6*a* from a further perspective.
Figure 8B:
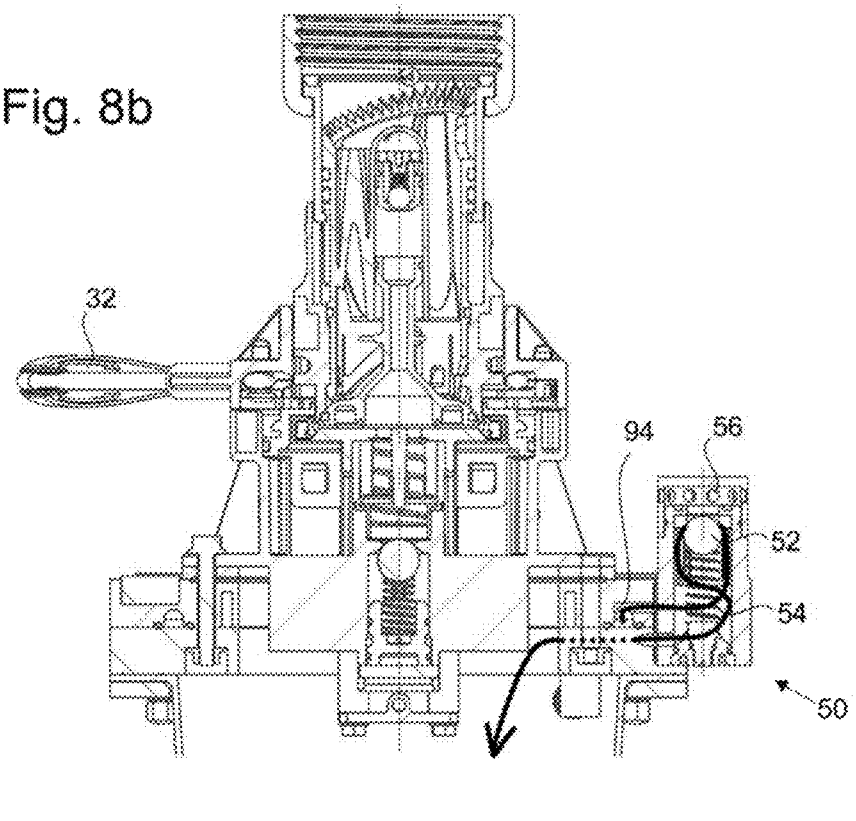

FIGS. 8*a* and 8*b* illustrate ventilation of the receiving container (not shown). In this case the reference numeral 50 relates to the ventilation apparatus. This has a plurality of openings 56, through which air can be drawn in. The reference numeral 52 designates a valve body which is biased upwards by a spring 54, i.e. into a closed position of the valve. This means that, on the one hand, air cannot exit through the openings 56, since this is prevented by the valve body 52. On the other hand, the valve is also only opened at a specific negative pressure of the receiving container (not shown). As shown by the solid line P7, the air flow passes through the valve and ultimately reaches the receiving container (not shown). For this purpose the device can have a channel which extends horizontally here and through which air can flow.

FIG. 8*b* shows a further representation of the air flow direction. It will be recognised that a plurality of flows can occur here, so that the air flow can also enter a circumferential channel 94 (upper line) and from there can enter the receiving container (not shown) at a plurality of locations. A comparatively quick ventilation of the receiving container is possible due to this procedure.

Figure 9A:
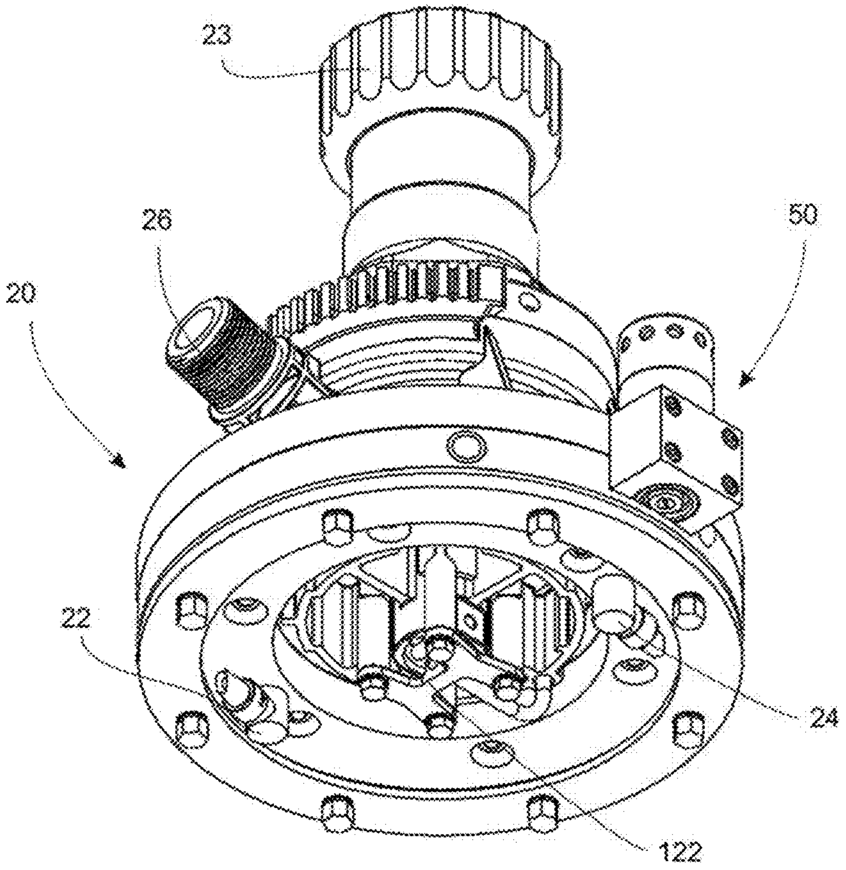
FIGS. 9*a*, 9*b* show two perspective representations of the device shown in FIG. 6 without the receiving container.
Figure 9B:
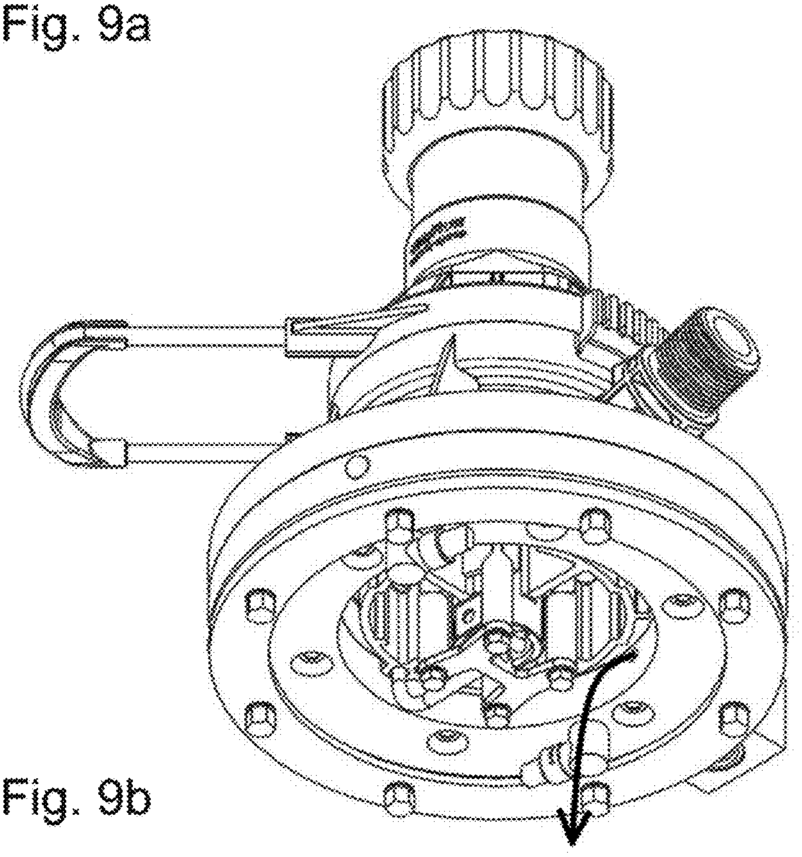

FIGS. 9*a*, 9*b* show a further representation of the device, wherein here too in particular the flow path of the air for ventilation of the receiving container is again illustrated. It will be recognised that this flow path extends through a channel which is located in the circumferential flange on which the cleaning elements are also arranged. In this case it would also be possible that for ventilation the same to channel is used which is also used for ventilation of the cleaning elements 22 and 24.

Figure 10:
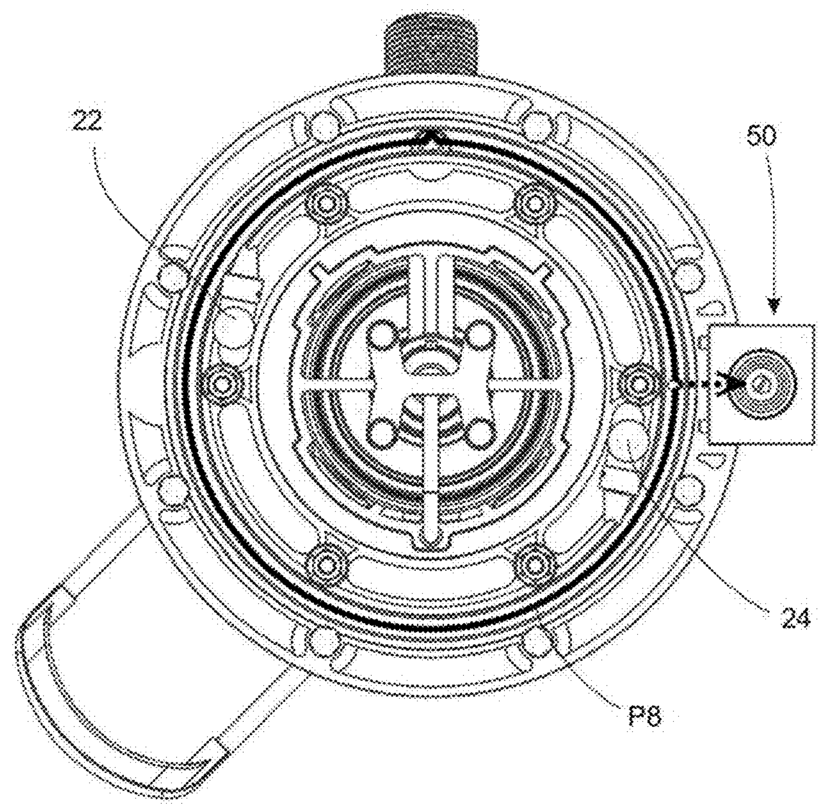
FIG. 10 shows a plan view from below of the device without the receiving container.

FIG. 10 shows a plan view from below of the device according to the invention. Here too is again the flow path of the ventilation air illustrated here is again guided in the annular channel. The ventilation apparatus 50 can also be seen in this illustration.

Figure 11:
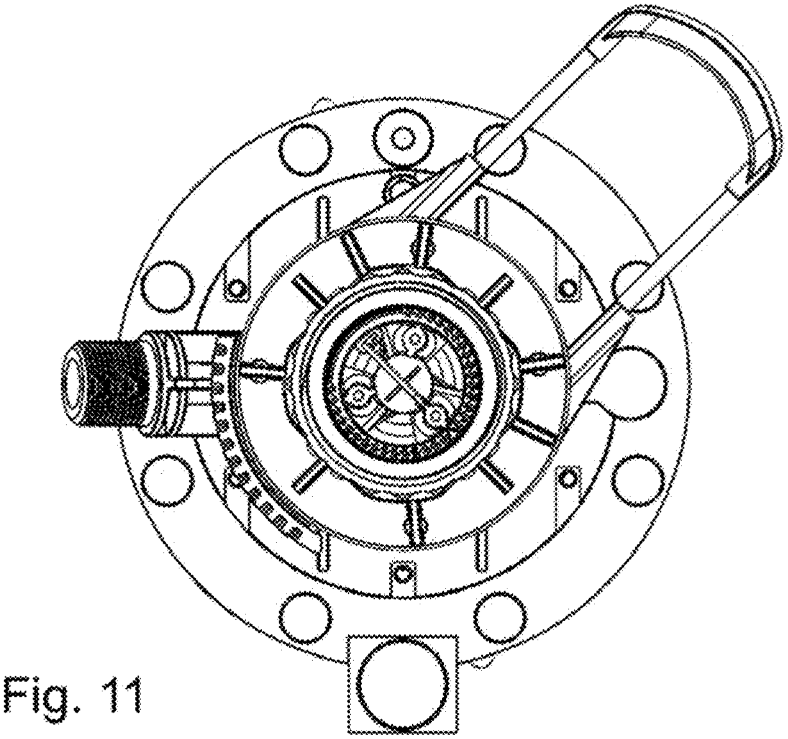
FIG. 11 shows a plan view from above of the device without a receiving container.

FIG. 11 shows a plan view from below of the device according to the invention. Here too both the flushing agent connection and also the ventilation apparatus 50 can again be seen. It will be recognised that the ventilation apparatus 50 is offset by 90° with respect to the flushing agent channel. The grip element 32 is arranged opposite an angle bisector between the ventilation apparatus 50 and the flushing agent channel. In this way it can be ensured that, on the one hand, the actuation of the grip element is restricted as little as possible by the flushing agent channel and the ventilation apparatus, and also this apparatus cannot be inadvertently damaged. The reference numeral 122 designates a support and the reference numeral 124 designates a circumferential wall which simultaneously also forms the flow channel for the liquid to be introduced into the canister.

Figure 12:
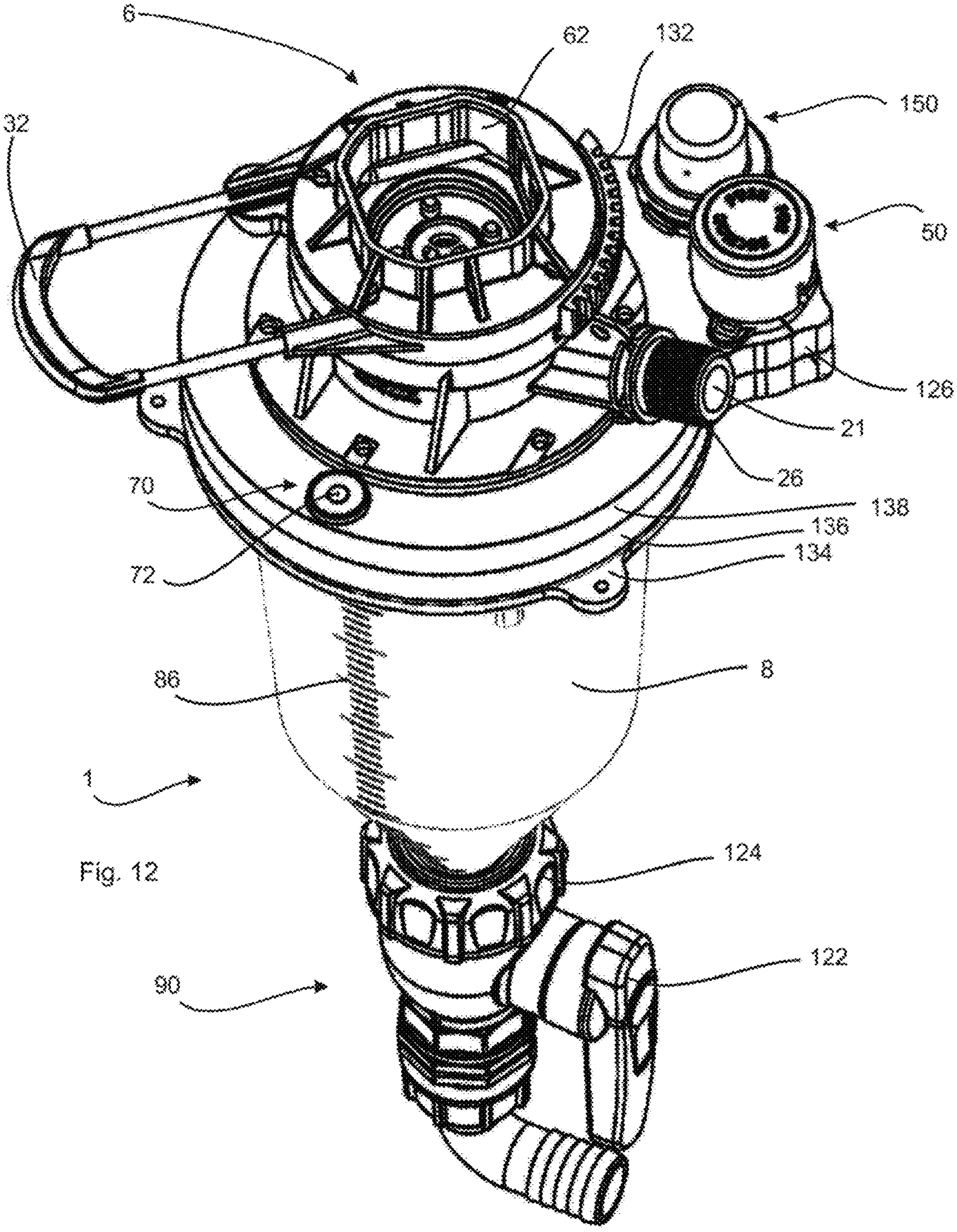
FIG. 12 shows a further overall representation of the device according to the invention.

FIG. 12 shows a further representation of the device 1 according to the invention. In addition to the embodiments in the preceding drawings, a display device 70 can be seen, which during serves to ensure that the device is filled in a correctly positioned state and in particular in a vertical state of the receiving container. In this case the measuring device 86 or the scale will form realistic display values. In this case the reference numeral 72 relates to an air bubble which is arranged inside a cavity filled with liquid. In this way the display device 70 is a so-called bubble tube.

The reference numeral 138 designates a flange on which the tank adapter is ultimately arranged and the reference numeral 136 relates to a second flange which in particular also serves for installation of the receiving container 8. These two flanges 136 and 138 can be screwed to one another.

The reference numeral 126 designates a projection on which here two actuating elements 150 and 50 are arranged. The actuating element 150 forms a so-called overflow valve or discharge device which serves for dispensing liquid in the event of overfilling of the receiving container 8. The more precise mode of operation is described below. The reference numeral 50 designates a suction valve or a ventilation valve which ensures the proper ventilation or venting of air from the receiving container 8.

Figure 13:
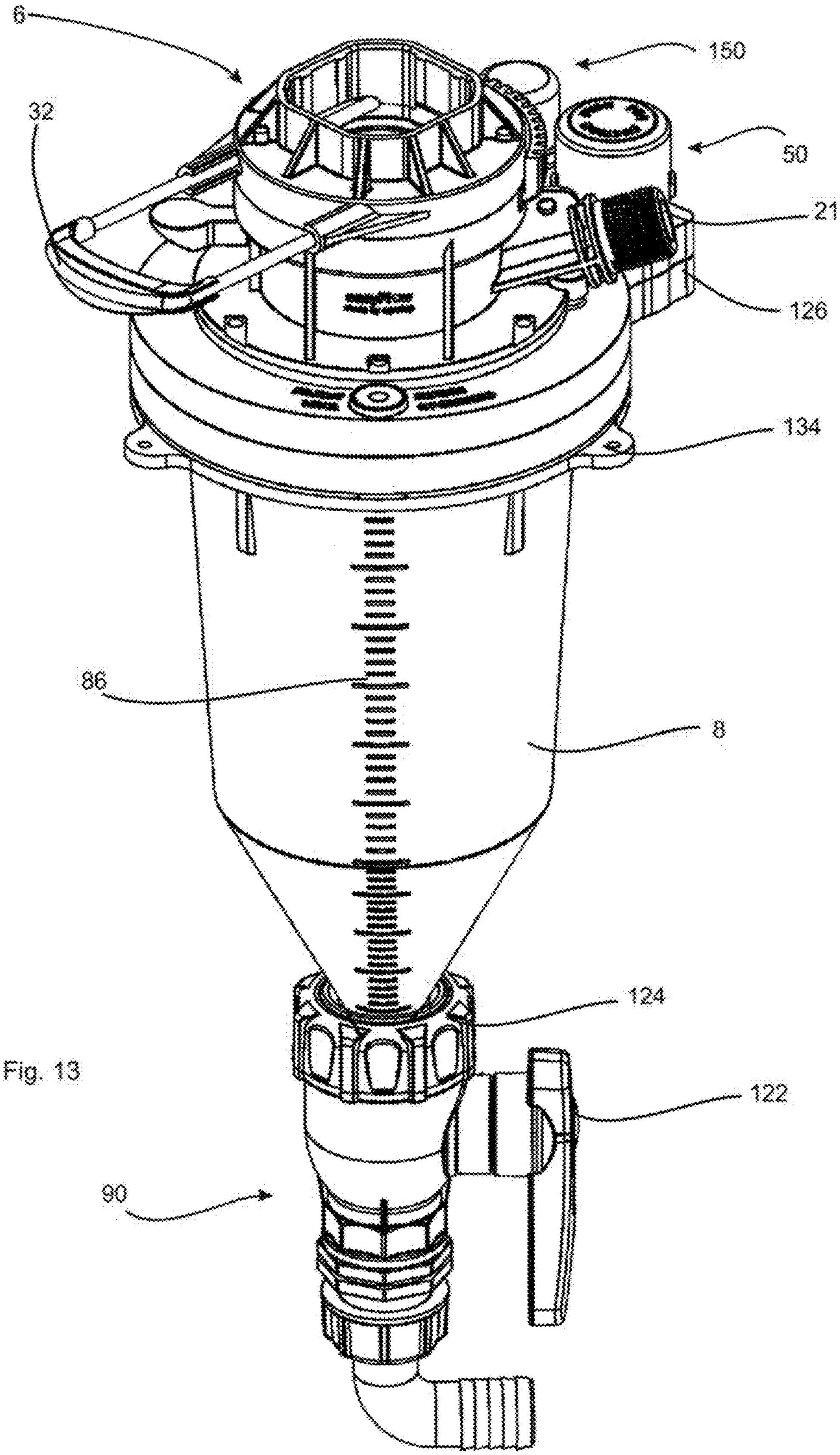
FIG. 13 shows a further representation of the device according to the invention.

FIG. 13 shows a further representation of the device according to the invention. Below the receiving container a fastening ring can be seen, by which overall the outlet 90 or also the valve device can be arranged. The reference numeral 122 designates a valve lever, by which an exhaust valve can be opened or closed. This valve can be for example a ball valve.

The reference numerals 134 designate fastening eyes, which in particular can serve for fastening the lower flange 134.

Figure 14:
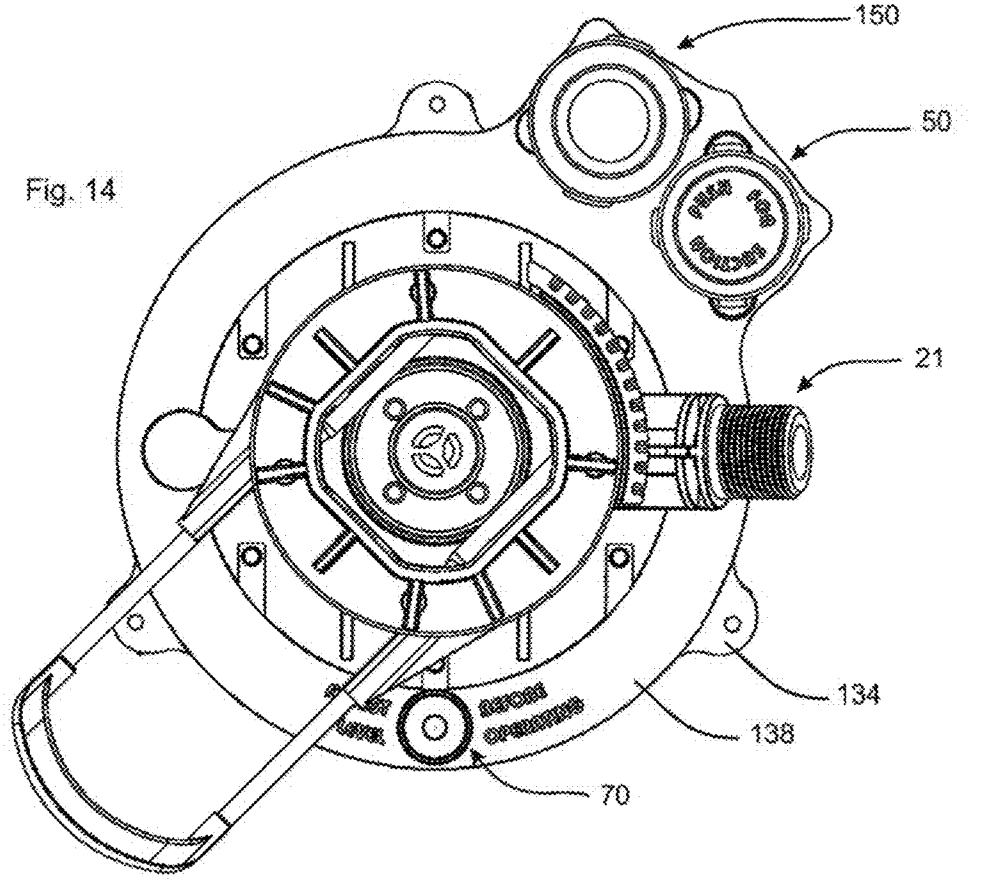
FIG. 14 shows a plan view from above of the device according to the invention.

FIG. 14 shows a plan view of the device according to the invention. This again shows the overflow valve 150 as well as the ventilation valve 50. Here too the bubble tube 70, which is arranged on the upper side of the flange 138, can again be seen.

Figure 15:
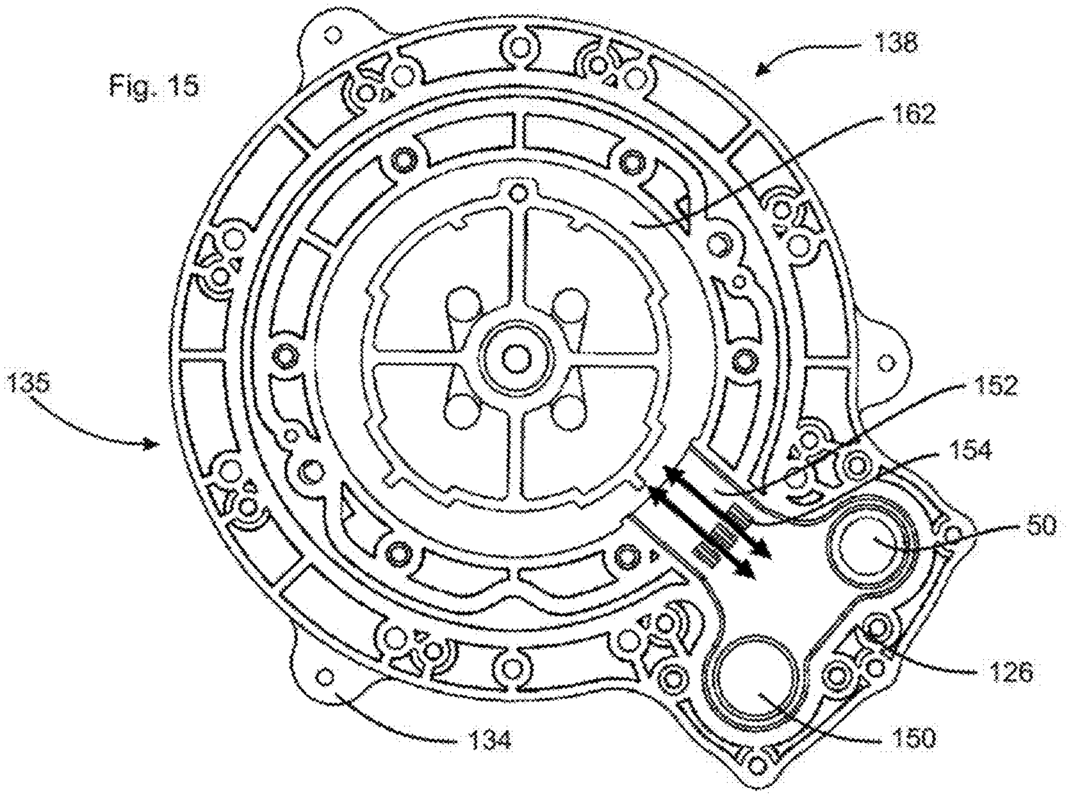
FIG. 15 shows a view from below of an upper flange of the device.

FIG. 15 shows the view from below of the flange 138. A circumferential channel 162, which serves for supplying the outlet elements 22 and 24, can be seen here. In addition, the projection 126 can again also be seen, as well as a wide channel 152, through which a flow connection can be made for example between the annular channel 162 and the ventilation apparatus 50, but by means of which a liquid exchange with the overflow valve 150 is also possible. However, the overflow valve can also be actuated by air pressure, wherein here too the air is guided through this channel 152. The reference numeral 154 identifies supporting bars which support the said channel. Both the overflow valve and also the venting arrangement 50 can preferably be actuated by means of air pressure. The reference sign 135 designates a circumferential edge of the flange 138. It will be recognised that this has cavities and support elements and in this way is designed to be both lightweight and also very stable.

Figure 16:
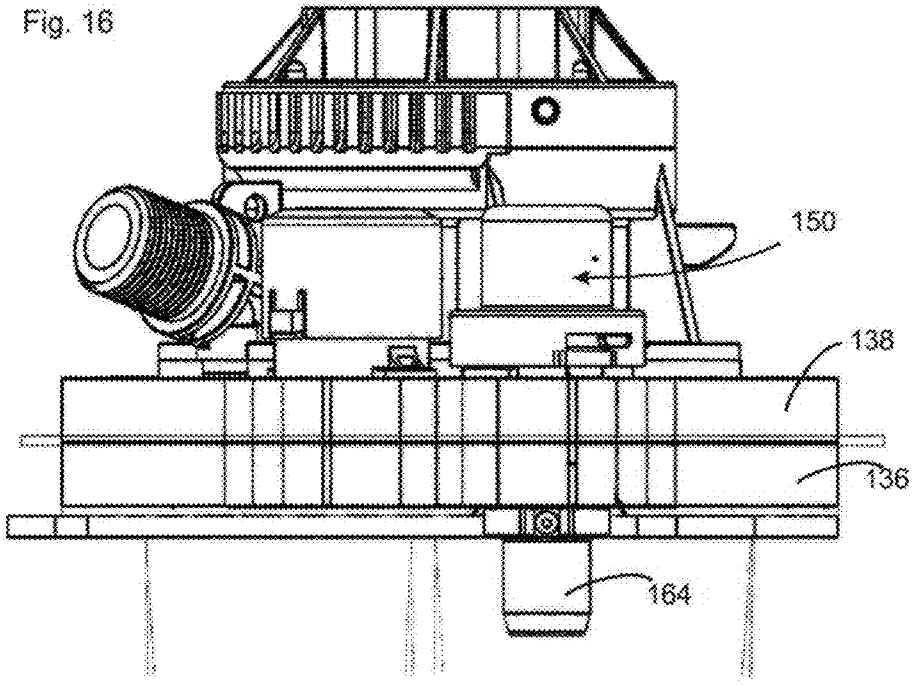
FIG. 16 shows a side view of the device according to the invention.

FIG. 16 shows a side view of the device according to the invention, in particular in the region of the flanges 136 and 138 and of the tank adapter. It will be recognised that the overflow device 150 opens into an outlet conduit 164. Excess liquid can be discharged via this outlet conduit.

This can be in particular liquid which can occur when the receiving container 8 is over-filled.

Figure 17:
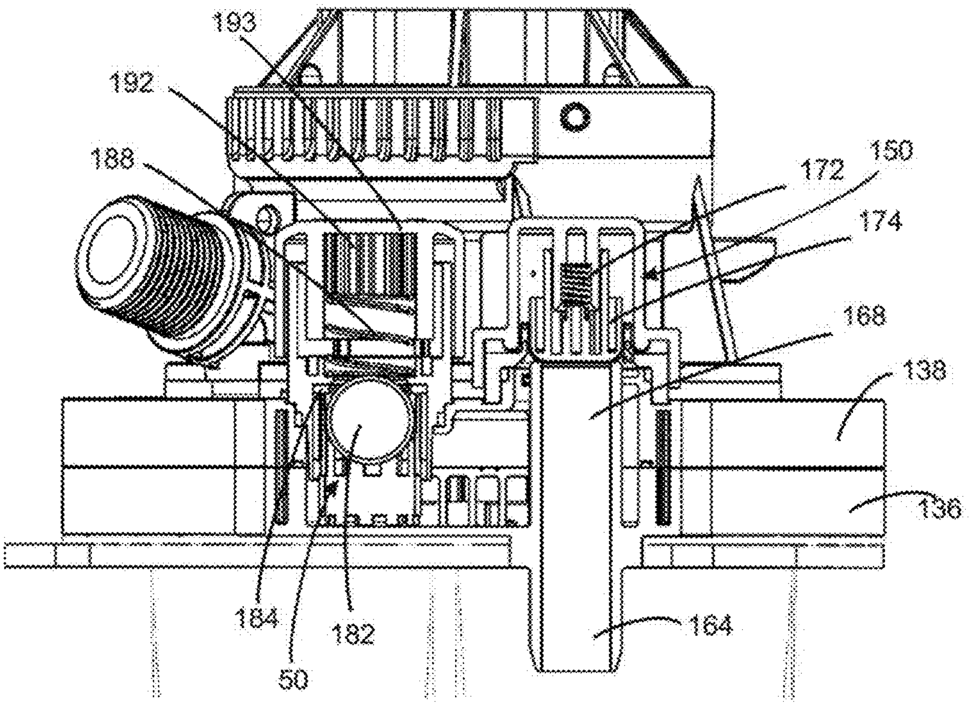
FIG. 17 shows a sectional representation of the device according to the invention.

FIG. 17 shows a sectional representation of the device shown in FIG. 16. It will be recognised here that the overflow device 50 has a valve device. This valve device has a valve body 174 which is biased downwards by means of a pretensioning device 172 such as a spring and in this way closes the channel 168. If a raised air pressure occurs, this valve can be opened and excess liquid can be discharged via the channel 168. It will be recognised that this channel 164 extends through the two flanges 138 and 136.

The ventilation apparatus 50 has a valve body 182 which here is configured as a hollow ball, which in a normal state of the system is pressed downwards by the spring 188 and thus holds the valve in an open position. In this case, however, it is also possible that this open position is maintained under the effect of gravity. The reference sign 184 designates a valve seat. In this situation air can flow in and in this way prevents a canister from collapsing due to a negative pressure. In the event of overfilling of the receiving container, the ball floats on the liquid medium flowing in from below and thus closes relative to the seal seat 184. In this situation no more ventilation can take place and in this way also the medium cannot exit further. Additionally, however, it is possible with the aid of the push button 193 to prevent the replenishment of air. In this case negative pressure, which is necessary for suction, can be established. After decreasing this negative pressure in the entire system, for safety reasons the sensor device 193 opens automatically by spring loading, that is to say under the effect of the spring 188.

Figure 18:
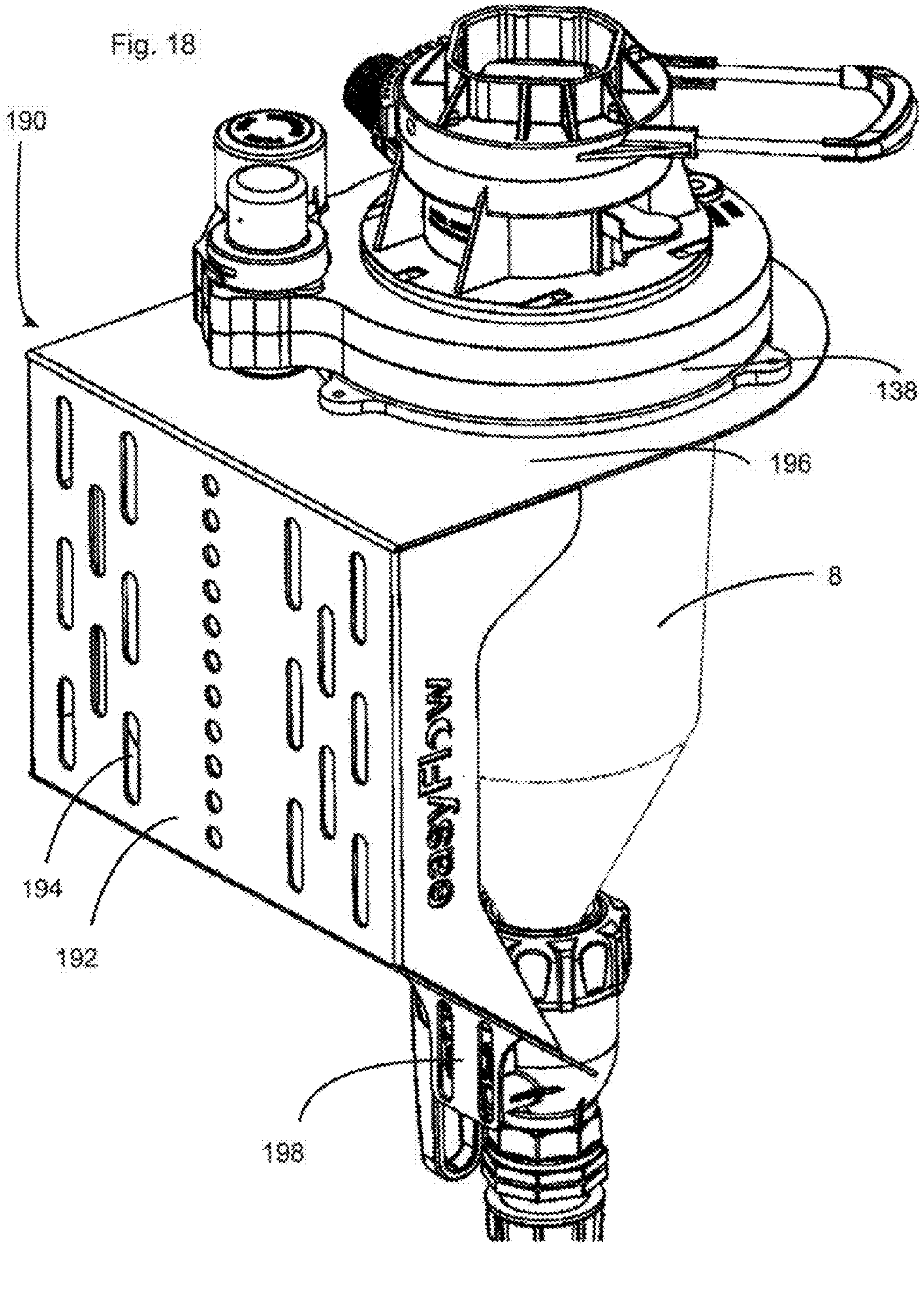
FIG. 18 shows a representation of the device with a holding device.

FIG. 18 shows a further representation of the device according to the invention, wherein here the device has a holding device 190 which serves for holding the device for example on a spraying unit. In this case this holding device 190 has a rear wall or a fastening surface 192, by means of which the holding device can be fastened to a unit. For the flexible arrangement this fastening portion 192 has a plurality of elongate holes, so that in particular fastening is also possible to differently configured securing elements.

The reference numeral 198 designates a further fastening portion which can be installed in particular in the region of an outlet of the device. The reference sign 196 designates a support plate of the holding device which here can be installed in particular below the flange 138.

Figure 19:
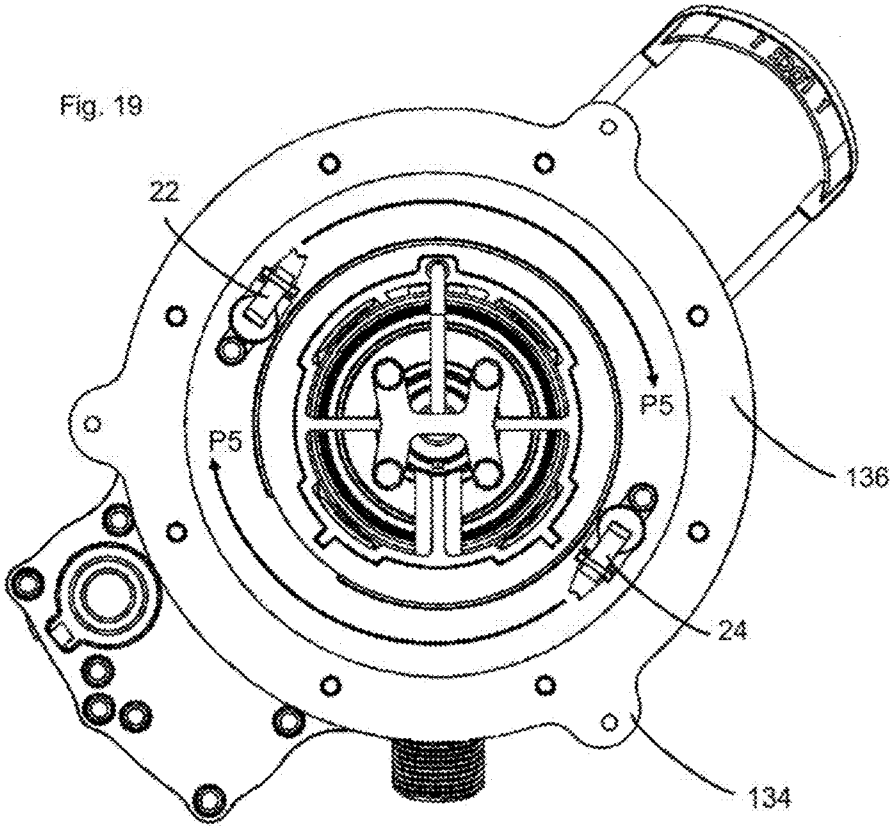
FIG. 19 shows a view from below of the region above the receiving container.

FIG. 19 shows a view from below of the lower flange 136. Here too the two outlet elements 22 and 24 are again provided, from which the cleaning medium can exit along the arrow P5. As mentioned above, in this way a spiral cleaning of the receiving container (not shown) is possible. As mentioned above, the two outlet elements 22 and 24 are supplied starting from an annular channel and ultimately also starting from the cleaning connection 21.

Figure 20:
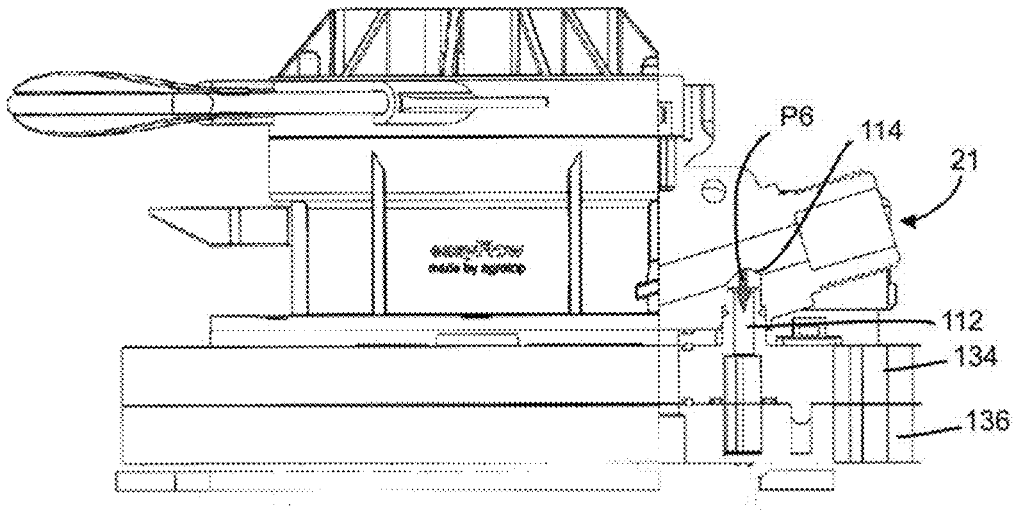
FIG. 20 shows a further side view of the device according to the invention.

FIG. 20 shows a further side view of the device according to the invention. In this view it is also illustrated by the arrow P6 how the cleaning liquid, starting from the cleaning connection 21, reaches the outlet element 22 and 24. For this purpose a conduit connection 112 is provided which also extends through the two flanges 134 and 138. In this case this conduit connection 112 in particular rectilinear or extends here in a vertical direction.

Figure 21:
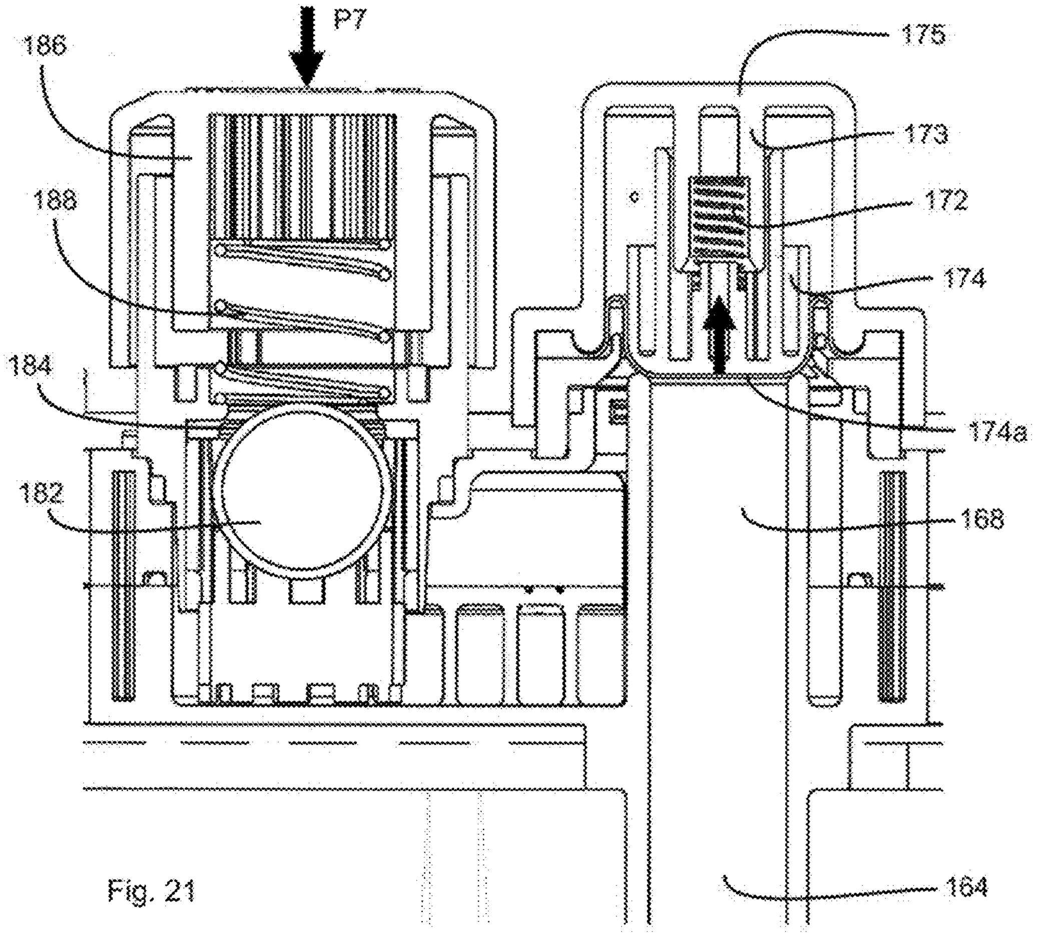
FIG. 21 shows a sectional representation of the device according to the invention.

FIG. 21 shows a further more precise representation for illustration of the venting device 50 as well as the overflow device 150. It will be recognised that the overflow device 150 likewise has an actuating element 175 which is constructed as a push button. When this push button is pressed the valve body 174 can be pressed onto the conduit 168 and in this way the valve can be closed. Accordingly an actuation of the push button 168, which forms a constituent of the venting device, is possible. By actuation of this push button the venting device is opened, so that removal of air from/delivery of air to the system is possible.

The applicant reserves the right to claim all the features disclosed in the application documents as essential to the invention in so far as they are individually or in combination novel over the prior art. Furthermore it is pointed out that features which may be advantageous per se have also been described in the individual drawings. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES

L line
P arrow
P1 arrow
P3 arrow
P4 arrow
P5 arrow
P6 arrow
1 tank/device
2 canister adapter/second coupling part/adapter device
4 coupling part/delivery device
6 tank adapter/coupling part
8 receiving container
10 canister
12 receiving container
20 cleaning device
21 flushing agent connection/cleaning connection
22 cleaning nozzle/cleaning element/outlet element
23 canister fastening flange
24 cleaning nozzle/cleaning element/outlet element

25 pipe
26 flushing agent channel
29 branch conduit
32 gripping element/actuating element
36 tank fastening flange
41 first coupling part
50 ventilation apparatus/suction valve/ventilation valve
52 valve body
54 spring
56 openings
62 coupling part
64 valve device/ball valve
66 valve device/ball valve
70 display device/bubble tube
72 air bubble
82 fastening flange
84 fastening screw
86 scale
88 thread
90 valve device/outlet
92 conduit
100 device
112 conduit connection
122 valve lever
126 projection
134 fastening eyes
134 lower flange
135 circumferential edge of the flange
136 second flange
138 first flange
150 actuating element: overflow valve
152 wide channel
154 supporting bars
162 circumferential channel
164 outlet conduit
164 channel
168 channel, conduit
168 button
172 pretensioning device
174 valve body
174 seal seat
175 actuating element
182 valve body
184 valve seat
188 spring
190 holding device
192 fastening portion
193 button
196 support plate of the holding device
198 fastening portion
306 sliding sleeve
311 connecting channel
312 shut-off element/valve
314 spring element
316 small hole
403 sealing element

The invention claimed is:

1. A device for filling tanks from a canister with a first adapter device which is configured for intermittent fastening to the canister and which has a delivery device by which a flowable medium can be conveyed out of the canister into the tank, wherein the device has a flushing agent connection configured to deliver a cleaning liquid to at least one component of the device, wherein the device has a further receiving container configured to temporarily receive the flowable medium to be introduced into the tank, and wherein the apparatus has an air supply and/or venting arrangement configured for delivery air to and/or venting air from the receiving container, wherein the air supply and/or venting arrangement has a valve device configured to control an air flow between the receiving container and the environment, wherein the valve device is constructed as a non-return valve.

2. The device according to claim 1, wherein the venting arrangement and/or a valve device of the air supply and/or venting arrangement is arranged laterally on a support of the device.

3. The device according to claim 1, wherein the air supply and/or venting arrangement has an air channel which extends at least in part in a straight line.

4. The device according to claim 1, wherein the receiving container is arranged downstream with respect to the delivery device in a flow direction of the liquid to be introduced into the tank.

5. The device according to claim 1, wherein the device has a valve device which adjoins the receiving container.

6. The device according to claim 1, wherein the device has a discharge device configured to discharge excess medium.

7. The device according to claim 6, wherein the discharge device has a first valve device which is configured to effect discharge of a liquid medium from the device by opening, wherein the first valve device is constructed as a non-return valve, and wherein a valve position of the first valve device can be changed by a positive pressure produced in the receiving container and/or the canister.

8. The device according to claim 7, wherein the discharge device has a second valve device.

9. The device according to claim 1, wherein the device has a measuring device for determining the amount of liquid to be introduced into the tank, wherein the further receiving container is constructed as a measuring device for determining the amount of liquid to be introduced into the tank, or has such a measuring device.

10. The device according to claim 9, wherein the device has a display device by which at least one spatial position of at least one component of the device can be detected and read off.

11. The device according to claim 10, wherein the display device is configured to enable detection of a spatial position of the further receiving container, wherein the display device enables the detection of the spatial position with respect to at least two axes which are perpendicular with respect to one another.

12. The device according to claim 10, wherein the display device has a cavity filled with a liquid.

13. The device according to claim 1, wherein the flushing agent connection is configured to enable cleaning liquid to be conveyed to the receiving container.

14. The device according to claim 13, further comprising at least one flushing agent channel configured to enable cleaning liquid to be conveyed from the flushing agent connection to the receiving container.

15. The device according to claim 14, wherein the at least one flushing agent channel is constructed at least in part as an annular channel.

16. The device according to claim 13, further comprising at least one outlet element which is oriented in such a way that cleaning liquid exiting from the at least one outlet element reaches an inner wall of the receiving container, wherein the at least one outlet element is arranged such that cleaning liquid exiting therefrom produces a vortex inside the receiving container.

17. The device according to claim 16, wherein the cleaning device has at least one second outlet element which is oriented such that cleaning liquid exiting from the second outlet element reaches the inner wall of the receiving container, wherein at least one outlet element protrudes into the receiving container.

18. The device according to claim 17, wherein the at least one outlet element or the second outlet element is connected to the flushing agent connection by a connecting conduit, wherein the connecting conduit is branched off from a flushing conduit.

19. The device according to claim 18, wherein the at least one outlet element has a cross-section size such that at least during a cleaning operation more liquid flows into the receiving container than cleaning liquid flowing off.

20. The device according to claim 18, wherein the connecting conduit extends at least in part through a fastening flange which serves for fastening the delivery device to the receiving container, wherein the connecting conduit extends in a straight line and in a vertical direction through the fastening flange.

* * * * *